(12) United States Patent
Higuchi et al.

(10) Patent No.: US 8,529,787 B2
(45) Date of Patent: Sep. 10, 2013

(54) COLLOIDAL SILICA CONTAINING SILICA SECONDARY PARTICLES HAVING BENT STRUCTURE AND/OR BRANCHED STRUCTURE, AND METHOD FOR PRODUCING SAME

(75) Inventors: Kazuaki Higuchi, Fukuchiyama (JP); Hideki Otsuki, Fukuchiyama (JP)

(73) Assignee: Fuso Chemical Co., Ltd., Osaka-Shi (JP)

( * ) Notice: Subject to any disclaimer, the term of this patent is extended or adjusted under 35 U.S.C. 154(b) by 68 days.

(21) Appl. No.: 12/998,096

(22) PCT Filed: Sep. 1, 2009

(86) PCT No.: PCT/JP2009/065232
§ 371 (c)(1),
(2), (4) Date: Mar. 17, 2011

(87) PCT Pub. No.: WO2010/035613
PCT Pub. Date: Apr. 1, 2010

(65) Prior Publication Data
US 2011/0163262 A1   Jul. 7, 2011

(30) Foreign Application Priority Data

Sep. 26, 2008   (JP) ................................. 2008-248948

(51) Int. Cl.
*C09K 13/00* (2006.01)
(52) U.S. Cl.
USPC ....... 252/79.1; 252/79.2; 252/79.3; 252/79.4; 423/324; 423/325; 423/335
(58) Field of Classification Search
USPC ................ 252/79.1–79.4; 423/324, 325, 335
See application file for complete search history.

(56) References Cited

U.S. PATENT DOCUMENTS

| 2,680,721 A | 6/1954 | Broge et al. |
| 4,708,859 A | 11/1987 | Chevallier |

(Continued)

FOREIGN PATENT DOCUMENTS

| CN | 1234603 A | 11/1999 |
| JP | 61-117113 A | 6/1986 |

(Continued)

OTHER PUBLICATIONS

Stöber et al. Journal of Colloid and Interface Science vol. 26, (1968) pp. 62-69.*

(Continued)

*Primary Examiner* — Lan Vinh
*Assistant Examiner* — Maki Angadi
(74) *Attorney, Agent, or Firm* — Edwards Wildman Palmer LLP; James E. Armstrong, IV; Nicholas J. DiCeglie, Jr.

(57) ABSTRACT

This invention provides a dense, high-purity colloidal silica containing silica secondary particles having a branched and/or bent structure, and a production method thereof. Specifically, this invention provides a method for producing a colloidal silica, comprising the steps of 1) preparing a mother liquid containing an alkali catalyst and water, and having a pH of 9 to 12; and 2) adding a hydrolysis liquid obtained by hydrolysis of an alkyl silicate to the mother liquid, wherein the step of adding the hydrolysis liquid to the mother liquid sequentially comprises A) step 1 of adding the hydrolysis liquid until the pH of the resulting liquid mixture becomes less than 7; B) step 2 of adding an aqueous alkali solution until the pH of the liquid mixture becomes 7 or more; and C) step 3 of adding the hydrolysis liquid while maintaining the pH of the liquid mixture at 7 or more, and a colloidal silica containing silica secondary particles having a branched and/or bent structure, obtained by this method.

20 Claims, 22 Drawing Sheets

(56) References Cited

U.S. PATENT DOCUMENTS

| | | | |
|---|---|---|---|
| 5,221,497 A | 6/1993 | Watanabe et al. | |
| 6,257,960 B1 | 7/2001 | Kikuta | |
| 6,334,880 B1 | 1/2002 | Negrych et al. | |
| 7,514,363 B2 * | 4/2009 | Banerjee et al. | 438/692 |
| 2007/0237701 A1 | 10/2007 | Yamakawa et al. | |
| 2010/0146864 A1 | 6/2010 | Nakayama et al. | |

FOREIGN PATENT DOCUMENTS

| | | |
|---|---|---|
| JP | 01-317115 A | 12/1989 |
| JP | 02-196015 A | 8/1990 |
| JP | 11-060232 A | 3/1999 |
| JP | 2000-001309 B1 | 1/2000 |
| JP | 2000-226453 A | 8/2000 |
| JP | 2001-002411 A | 1/2001 |
| JP | 2001-048520 A | 2/2001 |
| WO | WO-2006/011252 A1 | 2/2006 |
| WO | WO-2007/018069 A1 | 2/2007 |

OTHER PUBLICATIONS

Ismael et al. Refractories Applications and News, vol. 11, No. 4, pp. 16-20.*

International Search Report dated Dec. 15, 2009, issued for PCT/JP2009/065232.

Brinker et al. "Sol-Gel Science the Physics and Chemistry of Sol-Gel Processing," p. 102, (1989).

* cited by examiner

COLLOIDAL SILICA CONTAINING SILICA SECONDARY PARTICLES HAVING BENT STRUCTURE AND/OR BRANCHED STRUCTURE, AND METHOD FOR PRODUCING SAME

TECHNICAL FIELD

The present invention relates to a colloidal silica suitably used as a polishing material, a paint vehicle, a binder, or a nano-powder material, and to a method for producing the colloidal silica. In particular, the present invention relates to a colloidal silica containing silica secondary particles having a bent structure and/or a branched structure, and to a method for producing the same.

The term "bent structure" used herein refers to a structure in which three or more particles are joined together forming a line that is not rectilinear. The term "branched structure" used herein refers to a structure in which four or more particles are joined together without forming a line (having a branch). FIG. 10 shows specific examples of the bent structure and the branched structure.

BACKGROUND ART

A colloidal silica is a dispersion of silica fine particles in a medium such as water etc., and is used not only as a property-improving agent, a paint vehicle, an inorganic binder, in the fields of papers, fibers, steel, and the like, but also as a polishing material for electronic materials, such as semiconductor wafers, etc. Particularly when a colloidal silica is used as a polishing material, the silica particles are required to have higher purity and higher density.

Examples of known processes for producing a colloidal silica that can satisfy the above-mentioned requirements include a particle growth method comprising continuously adding an alkyl silicate hydrolysis solution to hot alkali water. In this particle growth method, an aqueous active silicic acid solution is added under an alkaline condition. Therefore, spherical, mono-dispersed silica particles with a dense structure are likely to be formed.

In recent years, subjecting spherical, mono-dispersed silica particles to deformation (i.e., into secondary particles having a complex structure) so as to adjust a contact resistance between a surface to be polished and the deformed silica particles used as a polishing material, and thereby further improve a polishing rate, has been considered.

Patent Literature 1 teaches, in a colloidal silica production method using an aqueous alkaline silicate solution as starting material, that the reduction in the pH to 5 to 6 at one point of the particle formation event may result in the formation of two-particle aggregates, three-particle aggregates, or even larger particle aggregates. However, since an alkaline silicate is used as starting material in this method, the purity would inevitably be reduced due to the residual alkali metal. Further, Patent Literature 1 nowhere teaches obtaining a colloidal silica containing a large number of silica particles having a branched structure and/or a bent structure.

Known methods for producing deformed silica particles include, as described in Patent Literature 2, a pH adjustment by adjusting the amount of alkali added; an addition of a salt; a temperature adjustment; and an adjustment of anion concentration, particle concentration, etc. In particular, with respect to the addition of a salt, Patent Literature 3 teaches a method for preparing an elongated colloidal silica with the addition of a calcium salt or a magnesium salt. However, if the shape of silica particles is controlled with the addition of a salt, metal impurities will be introduced therein. For this reason, a colloidal silica prepared by such a method is not suitable for use in a semiconductor manufacturing process, which requires a high grade of silica purity.

In the Stöber method using alkoxy silane, particles having a nodular shape are likely to be obtained. Patent Literature 4 discloses that a cocoon-shaped colloidal silica can be obtained by adjusting four factors, i.e., the addition rate of alkoxy silane, the content of ammonium ion, the amount of water added, and the reaction temperature. However, since this method does not allow particles to slowly grow, unlike the particle growth methods, a colloidal silica obtained by this method has problems in terms of the particle density and residual silanol groups. Further, in a Stöber method, the particle growth conditions, such as reaction temperature, moisture, ammonia concentration, and addition rate, must be rigorously controlled. This makes the maintenance of a stable quality difficult.

Patent Literature 5 teaches a method for producing a colloidal silica, comprising performing hydrolysis by adding tetraethoxysilane to an aqueous hydrochloric acid solution, and adding the resulting silicic acid monomer solution to an aqueous ethylenediamine solution having a pH of 11.1 over 2.5 hours so as to allow particles to grow. This method also produces only particles having a subglobose structure, similar to the above-described Stöber method. Moreover, chlorine ions will be incorporated into the produced colloidal silica, posing a problem in relation to anion contamination.

Likewise, Patent Literature 6 discloses a method for producing an elongated colloidal silica from an aqueous active silicic acid solution that is obtained by hydrolysis of ethyl silicate with an acid. This method also poses a problem in terms of anion contamination, due to the acid addition. Further, the particles have an elongated shape; or a distorted spherical structure, such as a cocoon shape, nodular shape, or the like. Therefore, a colloidal silica comprising a large number of silica particles that have a branched structure or a bent structure is not obtained in this method.

Patent Literature 7 discloses a technique comprising treating an aqueous alkali silicate solution with a cation exchange resin; adjusting the pH of the resulting silicate solution to 1.0 to 7.0 using an alkali such as KOH, NaOH, water-soluble amine, or the like, or an inorganic acid or an organic acid such as a hydrochloric acid, a sulfuric acid, a formic acid, or the like; heating the resulting product for aging to thereby advance high-polymerization of the silicic acid; adding a water-soluble amine thereto to adjust the pH thereof to 9 to 12.5 to prepare a seed liquid containing nodular particles; and subjecting the seed liquid to building up (particle growth). In this method as well, although ions are removed by a cation exchange resin or an anion exchange resin, metal ions or anions in an amount on the order of parts per million (ppm) remain. Therefore, this method cannot produce a colloidal silica with a purity high enough for use in a semiconductor manufacturing process. In addition, the steps of this method are problematic, because a cumbersome ion exchange operation needs to be repeated many times.

As described above, the hitherto disclosed production techniques cannot produce a dense, high-purity colloidal silica containing highly deformed silica particles with a branched structure and/or a bent structure, and small amounts of metal cations and acid-derived anions.

CITATION LIST

Patent Literature

PTL 1: U.S. Pat. No. 2,680,721
PTL 2: U.S. Pat. No. 6,334,880
PTL 3: Japanese Unexamined Patent Application Publication No. H1-317115
PTL 4: Japanese Unexamined Patent Application Publication No. H11-60232
PTL 5: Japanese Unexamined Patent Application Publication No. H13-02411
PTL 6: Japanese Unexamined Patent Application Publication No. H13-48520
PTL 7: WO 2007/018069

SUMMARY OF INVENTION

Technical Problem

A desired colloidal silica for use as a polishing material is a dense, high-purity colloidal silica containing silica secondary particles having a branched structure and/or a bent structure.

In view of the above, the main object of the present invention is to provide a dense, high-purity colloidal silica containing silica secondary particles having a branched structure and/or a bent structure, and a method for producing such a colloidal silica.

In connection with VOC (volatile organic compound) regulations, which have recently been imposed to prevent global warming and environmental pollution, coating compositions are required to be water-based, and development of inorganic vehicles is in demand for aqueous coating compositions exhibiting excellent coating properties. A colloidal silica comprising silica secondary particles having a branched structure or a bent structure exhibits excellent coating properties, due to the large aspect ratio of the branched and bent structures, and thus is also useful as a vehicle for aqueous coating compositions. Another object of this invention is to provide a colloidal silica that is also effectively used as a vehicle. The term "aspect ratio" refers to a ratio of the major axis to the minor axis of particles.

Solution to Problem

The present inventors conducted extensive research to achieve the above objects, and found that a colloidal silica obtained by a specific production method can achieve the above objects. Thereby, the present invention was accomplished.

Specifically, the present invention relates to the following colloidal silica and methods for producing the same. In this invention, an initially charged liquid (a liquid containing an alkali catalyst and water) used as starting material for forming particles is called a mother liquid.

1. A colloidal silica obtained by using an alkyl silicate as starting material, the colloidal silica containing silica secondary particles having a bent structure and/or a branched structure.

2. The colloidal silica according to Item 1, wherein the alkyl silicate is tetramethyl orthosilicate.

3. A polishing material comprising the colloidal silica of Item 1 or 2.

4. A production method for producing a colloidal silica, comprising the steps of:
   1) preparing a mother liquid containing an alkali catalyst and water, and having a pH of 9 to 12; and
   2) adding a hydrolysis liquid obtained by hydrolysis of an alkyl silicate to the mother liquid,
   wherein the step of adding the hydrolysis liquid to the mother liquid sequentially comprises:
     A) step 1 of adding the hydrolysis liquid until the pH of the resulting liquid mixture becomes less than 7;
     B) step 2 of adding an aqueous alkali solution until the pH of the liquid mixture becomes 7 or more; and
     C) step 3 of adding the hydrolysis liquid while maintaining the pH of the liquid mixture at 7 or more.

5. The production method according to Item 4, wherein the alkyl silicate is tetramethyl orthosilicate.

6. The production method according to Item 4 or 5, wherein the hydrolysis is carried out in the absence of a catalyst.

7. The production method according to any of Items 4 to 6, wherein in step 1, the hydrolysis liquid is added until the pH of the liquid mixture becomes 6 or more and less than 7.

8. The production method according to any of Items 4 to 7, wherein in steps 1 and 3, the hydrolysis liquid is added to the mother liquid at a rate of 41 g silica/hour/kg of mother liquid, or less.

9. The production method according to Item 8, wherein steps 1 and 2 are carried out so that the liquid mixture has a pH value of less than 7 for 0.5 to 5 hours.

10. The production method according to any of Items 4 to 9, wherein steps 1 to 3 are carried out without adding seed particles to the mother liquid in advance.

ADVANTAGEOUS EFFECTS OF INVENTION

The colloidal silica of the present invention comprises silica secondary particles having a bent structure and/or a branched structure. Due to the unprecedented complex structure of the secondary particles, when the colloidal silica is used as a polishing material, the contact resistance between the polishing material and a surface to be polished can be adjusted to thereby improve the polishing rate.

Further, the silica secondary particles have a bent and/or branched structure, and thus a large aspect ratio. Since such silica secondary particles are superimposed over or entangled with one another, they exhibit excellent coating properties, and can therefore improve the coating properties when used as a vehicle for aqueous coating compositions.

The method for producing a colloidal silica of the present invention can readily produce a high-purity colloidal silica having the above structure without using seed particles.

DESCRIPTION OF EMBODIMENTS

1. Colloidal Silica

The colloidal silica of the present invention has features in that it is obtained by using an alkyl silicate as starting material, and that it comprises silica secondary particles having a bent structure and/or a branched structure. As the alkyl silicate used as starting material, tetramethyl orthosilicate (TMOS) is preferably used.

The content of silica secondary particles having a bent structure and/or a branched structure is preferably 30% or more, based on the number of the particles within a 200,000× magnified arbitrary view observed through a scanning electron microscope (SEM). The average value of the aspect ratio of the particles (an average aspect ratio) observed in the above view is preferably 1.5 or more, and less than 5. If the average aspect ratio exceeds 5, handling thereof will be difficult due to the increase in viscosity etc., and gelation may occur.

The average particle diameter of the primary particles, which form the above-mentioned secondary particles, is not limited, but is generally about 5 to about 200 nm, and particularly preferably 10 to 100 nm. The average particle diameter represents a primary particle diameter, which is calculated by 2727/a specific surface area value. Separately, the average particle diameter measured by a dynamic light-scattering method ("ELS8000", produced by Otsuka Electronics Co., Ltd.) represents a secondary particle diameter.

Figure 10:
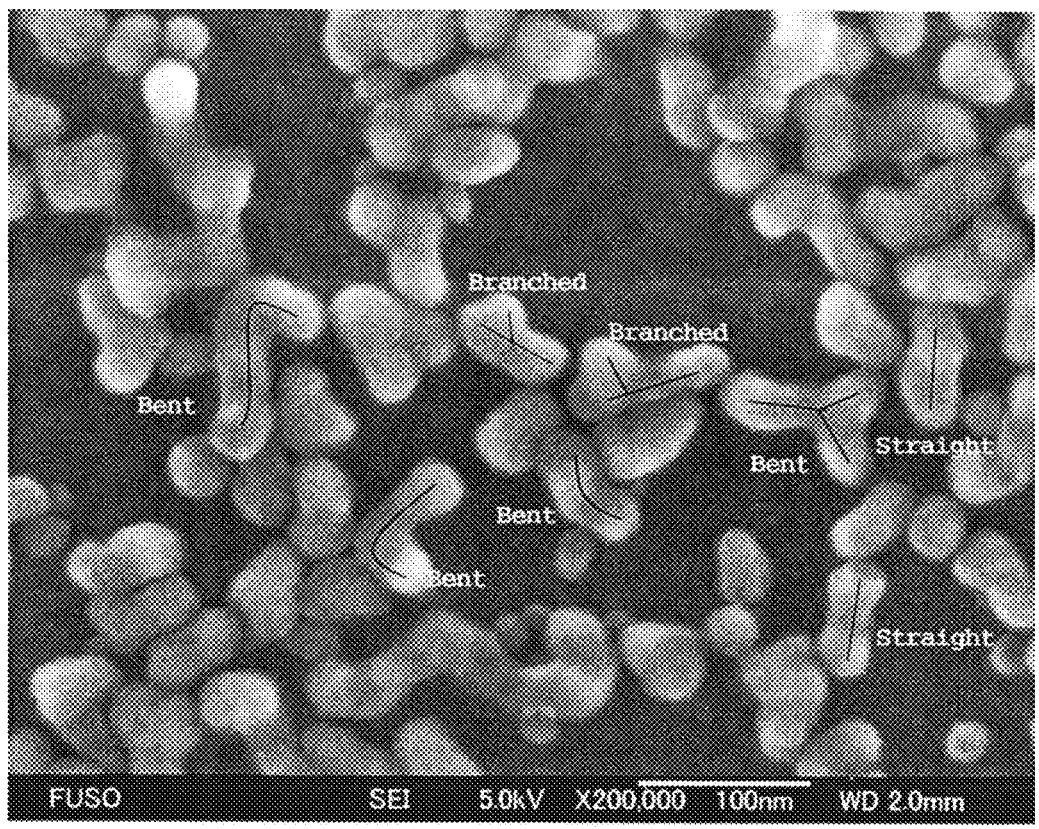
FIG. 10 is a scanning electron microscope (SEM) observation image of the colloidal silica obtained in Example 1.

In the present invention, the secondary particles have a bent structure or a branched structure, as shown in FIG. 10. Particles having a diameter of 30 nm or more used as a measurement sample in the dynamic light-scattering method are prepared by adding 200 μL of a colloidal silica to 10 mL of a 0.05 wt. % aqueous sodium decyl sulfate (SDS) solution, and homogenizing the resulting product. Particles having a diameter below 30 nm used as a measurement sample are prepared by adding 4 mL of a colloidal silica to 50 mL of a 0.3 wt. % aqueous citric acid solution, and homogenizing the resulting product.

When a colloidal silica is used as a polishing material, silica particles having a dense structure must be prepared. More specifically, particles in which siloxane bonds are more completely formed are required to be prepared. In other words, it is preferable to prepare particles having a small amount of residual silanol groups. The present inventors found that a solid-state $^{29}$Si CP/MAS NMR spectrum can detect $^{29}$Si having OH in close proximity; and that the total area of three peaks, normalized with an internal standard peak area, i.e., a peak area value, is usable as an index for evaluating density of silica particles. As revealed in Table 1, a comparison of spectrums of a colloidal silica obtained by a known water glass method and a colloidal silica obtained by a Stöber method shows a remarkable difference between their peak area values. Table 1 further confirms that the absolute specific gravity of the colloidal silica obtained by the Stöber method is smaller than 2.2 (Kagaku Dai Jiten (Encyclopedia of Chemistry)), which is the value of the absolute specific gravity of a known silica.

TABLE 1

| Category | Sample | Specific Surface Area (m²/g) | Si(OH)$_2$ | Si(OH)$_1$ | Si(OH)$_0$ | Peak Area Value | Absolute Specific Gravity |
|---|---|---|---|---|---|---|---|
| Water Glass Method | "Snowtex-20" produced by Nissan Chemical Industries, Ltd. | 195 | 2 | 50 | 48 | 4.0 | 2.2 |

TABLE 1-continued

| Category | Sample | Specific Surface Area (m$^2$/g) | Si(OH)$_2$ | Si(OH)$_1$ | Si(OH)$_0$ | Peak Area Value | Absolute Specific Gravity |
|---|---|---|---|---|---|---|---|
| Stöber Method | "PL-2L" Produced by Fuso Chemical Co., Ltd. | 136 | 5 | 49 | 46 | 47.8 | 2.0 |

In Table 1, Si(OH)$_2$ represents Si(OH)$_2$(OSi)$_2$; Si(OH)$_1$ represents Si(OH)(OSi)$_3$; and Si(OH)$_0$ represents Si(OSi)$_4$. The peak area value represents a total area of three peaks, normalized with an internal standard peak area. The absolute specific gravity is a value measured using a liquid phase substitution method after the sample is dried on a 50° C. hot plate, and then maintained in a 300° C. furnace for 1 hour.

The peak area value of the colloidal silica of the present invention is preferably 20 or less, particularly preferably 15 or less. The lower limit thereof is not limited, but is about 5.

The above-mentioned peak area value represents the number of the residual silanol groups in a colloidal silica (see, for example, "43rd Proceedings of the Thermosetting Plastics Symposium Japan", page 45 (1993)). Specifically, with respect to Si(OH)$_2$ and Si(OH)$_1$, the number of Si atoms having OH groups directly bonded to the Si are counted; and with respect to Si(OH)$_0$, the number of Si atoms having no OH groups directly bonded to the Si, but having OH groups in close proximity, are counted. The smaller the peak area value, the smaller the absolute number of residual silanol groups. Therefore, a small peak area value is preferable in terms of the colloidal silica of the present invention.

Figure 21:
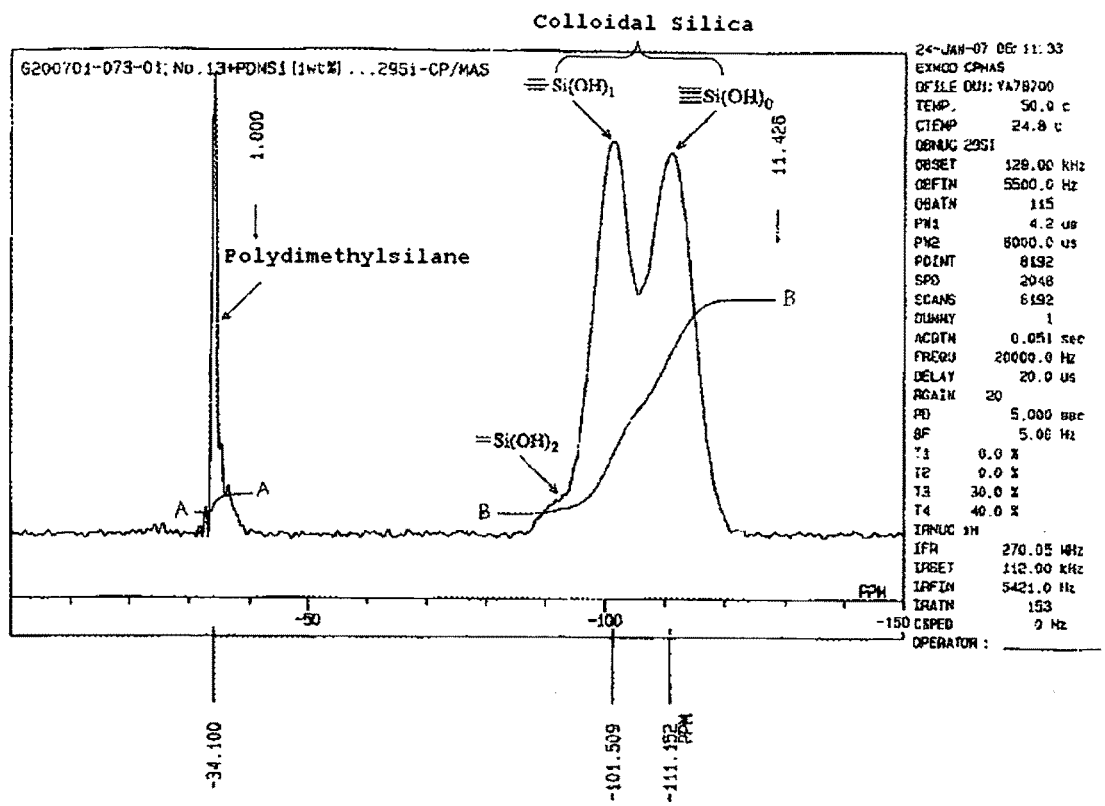
FIG. 21 is a solid-state $^{29}$Si CP/MAS NMR spectrum with respect to the colloidal silica obtained in Comparative Example 1.
Figure 22:
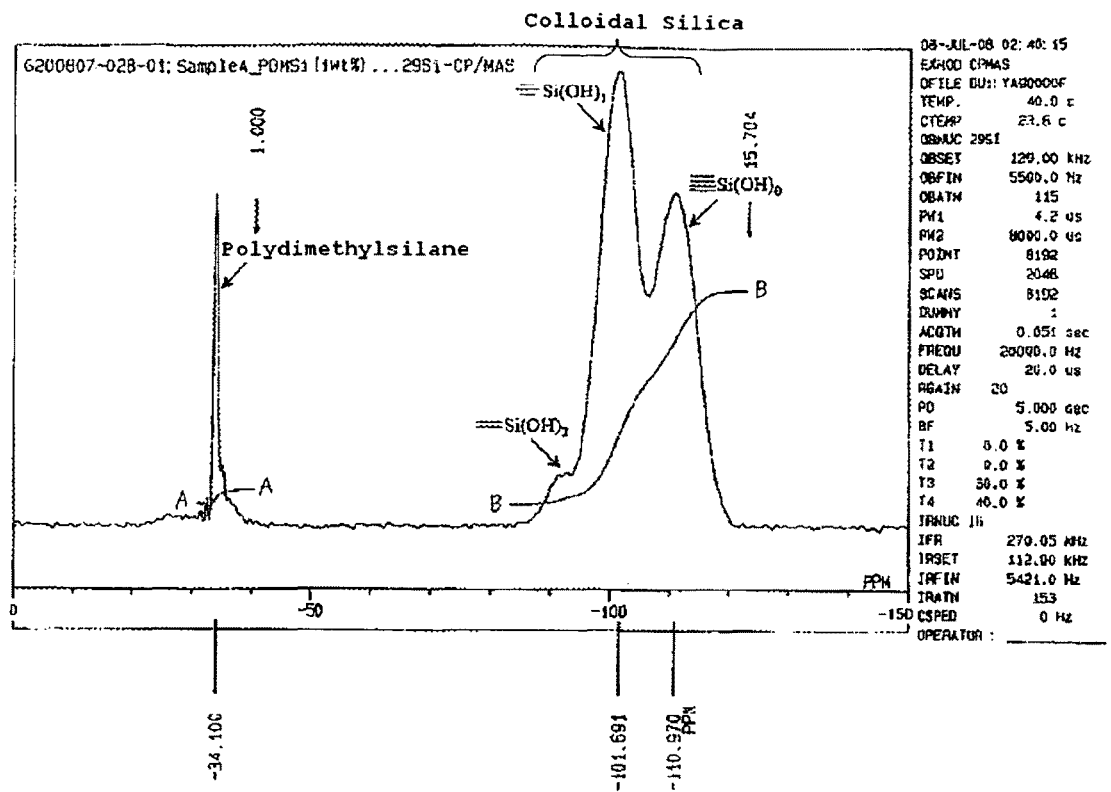
FIG. 22 is a solid-state $^{29}$Si CP/MAS NMR spectrum with respect to the colloidal silica obtained in Comparative Example 2.
Figure 24:
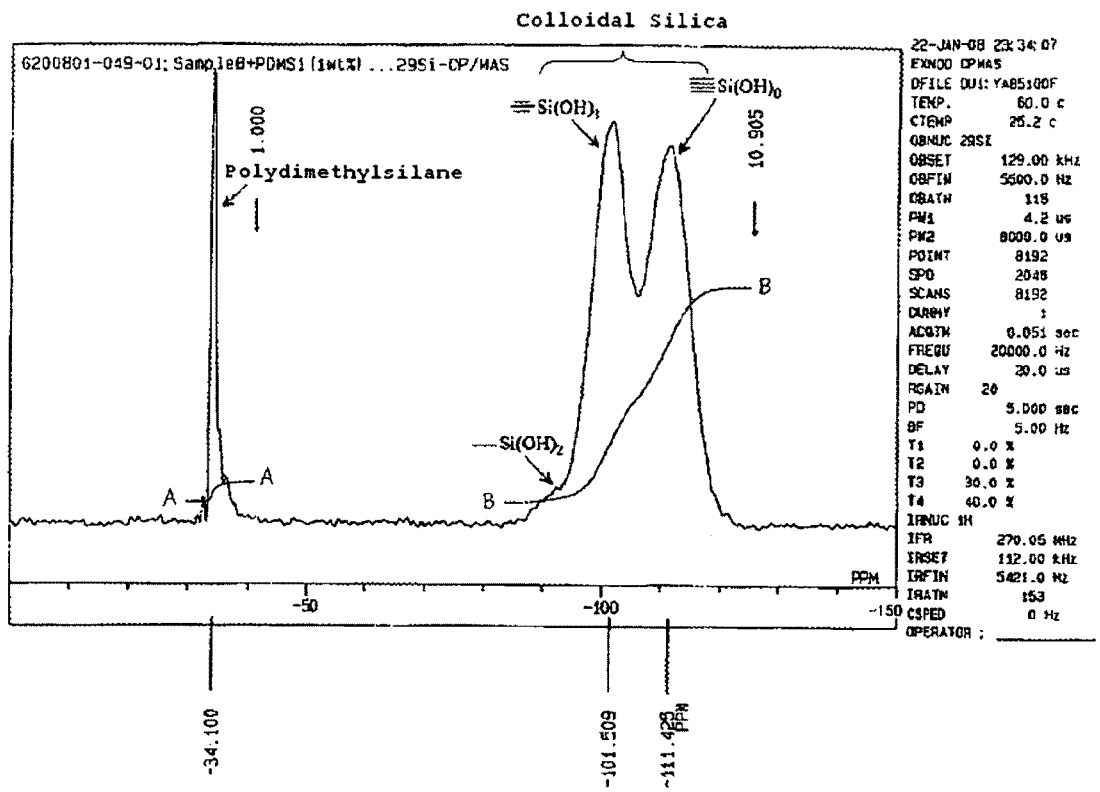
FIG. 24 is a solid-state $^{29}$Si CP/MAS NMR spectrum with respect to the colloidal silica obtained in Example 3.
Figure 25:
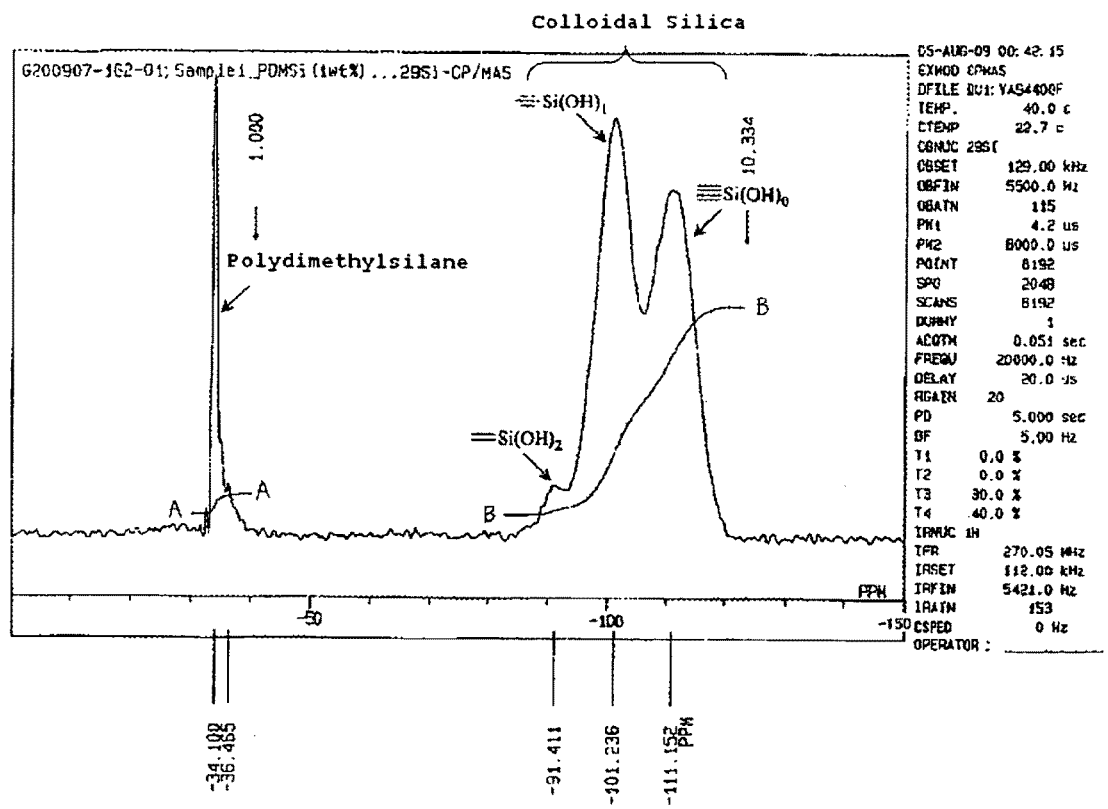
FIG. 25 is a solid-state $^{29}$Si CP/MAS NMR spectrum with respect to the colloidal silica obtained in Example 4.
Figure 26:
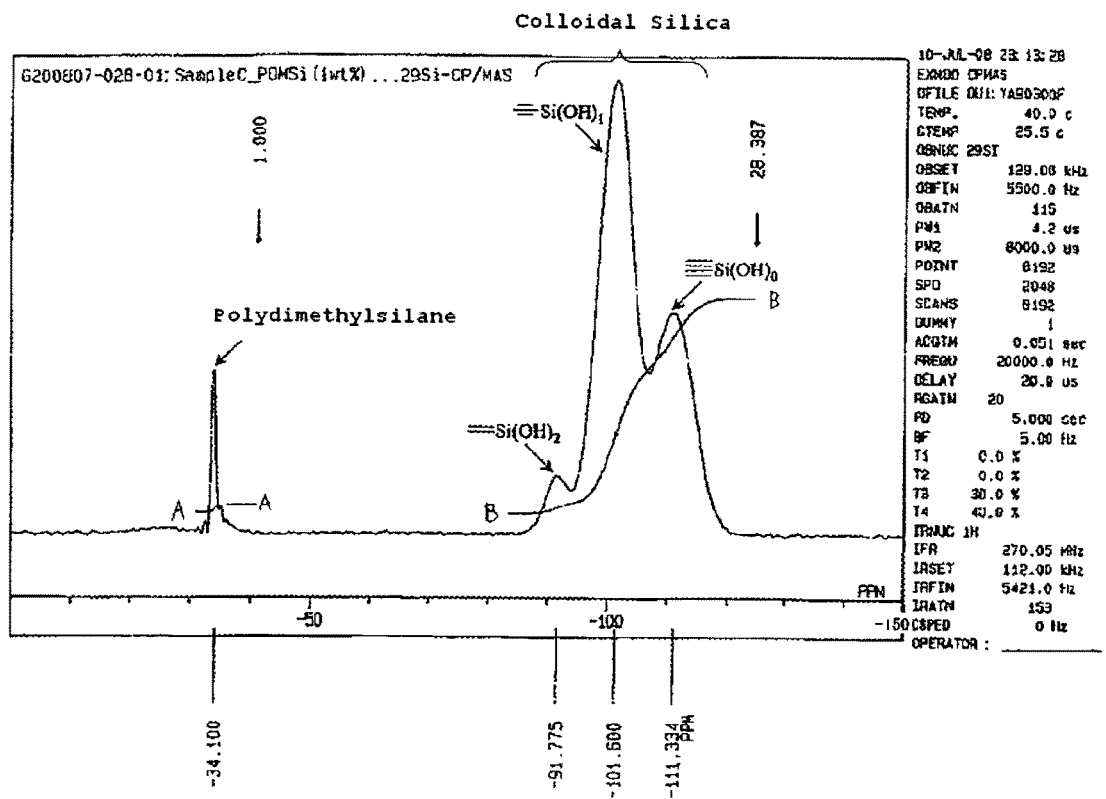
FIG. 26 is a solid-state $^{29}$Si CP/MAS NMR spectrum with respect to the seed particles PL-2H used in Comparative Example 2.

FIGS. 20, 23, 24, and 25 are solid-state $^{29}$Si CP/MAS NMR spectrums with respect to dried products of the colloidal silicas of the present invention. FIGS. 21, 22, and 26 are solid-state $^{29}$Si CP/MAS NMR spectrums with respect to dried products of the colloidal silicas of the Comparative Examples. In each of FIGS. 20 to 26, the difference of elevation between A-A represents the polydimethylsilane peak area, and the difference of elevation between B-B represents the colloidal silica peak area. In relation to this, a normalization value determined by considering the polydimethylsilane peak area as "1" serves as a peak area value, which is shown near the upper-right of the corresponding peak on the NMR chart.

Figure 20:
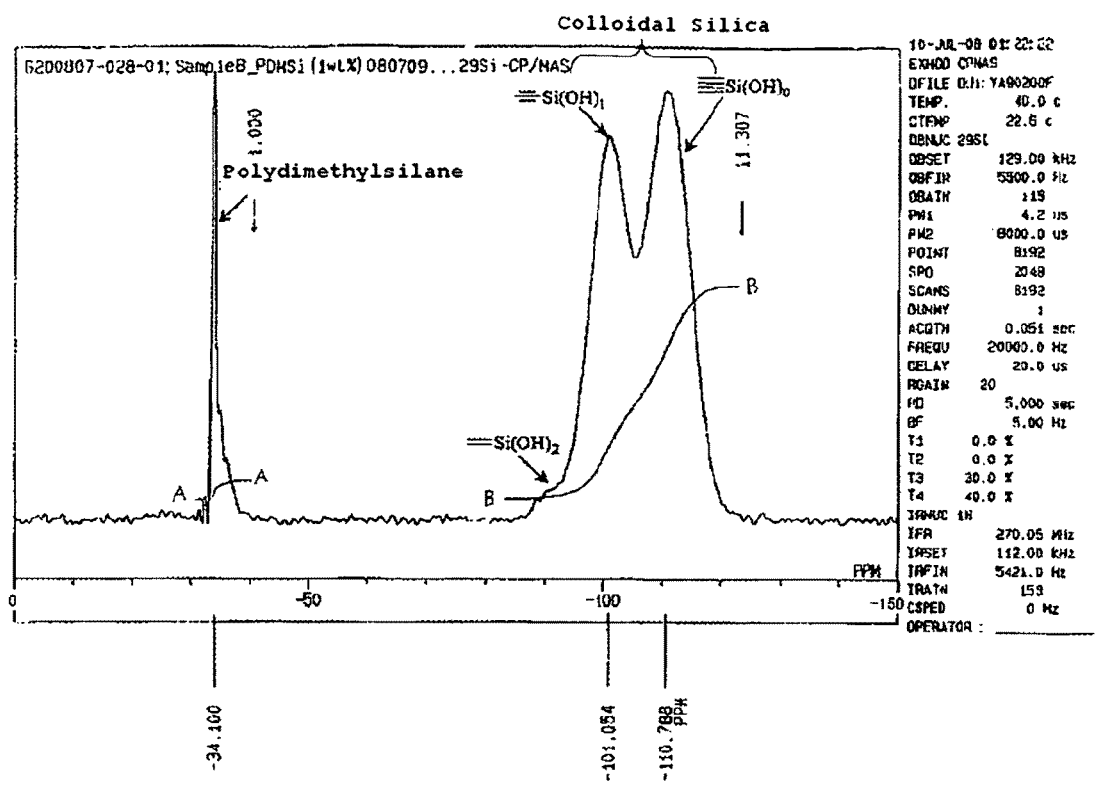
FIG. 20 is a solid-state $^{29}$Si CP/MAS NMR spectrum with respect to the colloidal silica obtained in Example 1.

Comparing the results, the peak area value is 11.307 in FIG. 20, which reveals that the colloidal silica of the present invention contains very few residual silanol groups as an absolute number. The peak area value above can be calculated from the ratio of the heights of integration curve determined by a data-processing circuit equipped with a known NMR spectrometer.

In the solid-state $^{29}$Si CP/MAS NMR spectrum of the colloidal silica of the present invention, the peak intensity ratio of Si(OH)$_0$ is preferably 40 or more, more preferably 45 or more, and most preferably 50 or more, relative to the total intensity (area value) of the colloidal silica-originating peaks, which is taken as 100. The above peak intensity ratio value indicates that the colloidal silica, when used for polishing, has a high density at around the surface of the silica particles that directly contact a surface to be polished therewith.

Table 2 below shows that the intensity ratio of Si(OH)$_0$ is 55 in Example 1, although it is 45 in Comparative Example 2, as shown in Table 4. In other words, the results shown in Table 2 indicate that, in particular, each surface layer portion of the silica particles comprise a reduced proportion of residual silanol groups. The intensity ratio mentioned above is a percentage value calculated using the ratio of intensities of the peaks of Si(OH)$_2$, Si(OH)$_1$, and Si(OH)$_0$, obtained as a result of the waveform separation of the colloidal silica-originating peak using a known NMR spectrum analyzer.

The term "dried product" used herein refers to a product obtained by placing, into a 50 mL porcelain crucible, 10 g of the colloidal silica of the present invention whose silica content is adjusted to 10 wt. %; and subjecting the obtained product to heat treatment for 10 hours on a hot plate set to a temperature of 150° C.

The polydimethylsilane usable in the present invention has a weight average molecular weight of 2,000. As an NMR spectral analyzer, EX-270 manufactured by JEOL Ltd. is used.

Each amount of 1) sodium; 2) an alkaline earth metal selected from the group consisting of calcium and magnesium; and 3) a heavy metal selected from the group consisting of iron, titanium, nickel, chromium, copper, zinc, lead, silver, manganese, and cobalt, contained in the colloidal silica of the present invention, is preferably 1 wt. ppm or less. In particular, when used as a polishing material for polishing an electronic material, the colloidal silica of the present invention preferably contains a small amount of, or does not contain, sodium, which has an adverse effect on electronic materials. It is more preferable that each amount of sodium, an alkaline earth metal and a heavy metal contained in the colloidal silica of the present invention is 1 wt. ppm or less. In the present invention, a heavy metal refers to a metal element having a density of 4 g/cm$^3$ or more. The content of an alkaline earth metal and the content of a heavy metal indicate contents of each metal element.

The present invention also encompasses a polishing material that comprises the colloidal silica of the present invention. In particular, the colloidal silica of the present invention can be suitably used as a polishing material for polishing electronic materials. Examples include silicon wafer polish; chemical mechanical polishing (CMP) in an LSI manufacturing process; photomask blank polish; hard disk polish; and the like.

Such polishing materials may be used in the same manner as known polishing materials. For example, in order to polish a silicon wafer, the concentration of the polishing material is adjusted depending on the application etc. of the silicon wafer, and is then added dropwise onto a polishing pad attached to a platen equipped with a polishing machine.

2. Method for Producing Colloidal Silica

The colloidal silica of the present invention is produced by using, as a silica starting material, an alkyl silicate, which can be highly purified by distillation. As the silica starting material, tetramethyl orthosilicate (TMOS) is preferably used, because it can be highly purified, is highly reactive, and is easily hydrolyzed even at ordinary temperature in the absence of a catalyst.

Specifically, the following are preferable embodiments of the production process.

A method for producing a colloidal silica, comprising the steps of: 1) preparing an alkaline mother liquid comprising an alkali catalyst and water; and 2) adding a hydrolysis liquid obtained by hydrolysis of an alkyl silicate to the mother liquid, wherein the step of adding the hydrolysis liquid to the mother liquid sequentially comprises: A) step 1 of adding the hydrolysis liquid until the pH of the resulting liquid mixture becomes less than 7; B) step 2 of adding an aqueous alkali solution until the pH of the liquid mixture becomes 7 or more; and C) step 3 of adding the hydrolysis liquid while maintaining the pH of the liquid mixture at 7 or more.

Hereinafter, the production process of the present invention is described.

Mother Liquid Preparation Step

In the mother liquid preparation step, a mother liquid containing an alkali catalyst and water is prepared. A mother liquid can be prepared by, for example, adding an alkali catalyst to water.

As such an alkali catalyst, a known alkali catalyst can be utilized. In terms of avoiding the introduction of metal impurities, however, the alkali catalyst is preferably an organic base catalyst that is free from metal components. Examples of such organic base catalysts include nitrogen-containing organic base catalysts such as ethylenediamine, diethylenetriamine, triethylenetetramine, ammonia, urea, monoethanolamine, diethanolamine, triethanolamine, tetramethylammonium hydroxide (TMAH), tetramethylguanidine, and the like. Preferred are low-volatile organic base catalysts, which do not undergo volatilization in the temperature range applied in an adding step (under heating). If a base that undergoes volatilization is used, the base may be continuously added to maintain the pH in the reaction system. These may be used singly, or in a combination of two or more. As an exception, when a colloidal silica is used as a polishing material, KOH may be included therein as a component in some cases. For such a polishing material having such a composition, KOH may also be used as an alkali catalyst.

The amount of the alkali catalyst added to a mother liquid may appropriately be adjusted so that the pH of the mother liquid is generally within the range of 7 to 14, preferably 9 to 12, and more preferably 9 to 11.

If an alkali catalyst is added in a small amount, particle size will be still small when the pH is shifted to acidic. Therefore, even if the particles are allowed to aggregate in an acidic state, sufficient deformation would not occur. Specifically, if particles are too small, less deformation will occur during the particle growth process. If an alkali catalyst is used in a large amount, particle size will be large when the pH is shifted to acidic, causing less aggregation in an acidic state. As a result, sufficiently deformed particles cannot be obtained.

In the present invention, the mother liquid is preferably heated when an alkyl silicate hydrolysis liquid described later is added. In particular, the mother liquid is preferably heated to water reflux (water circulation). The reflux can be done with a known device. A higher reaction temperature can produce denser particles. Considering this, the adding step may be performed under pressure so that the reaction mixture can be refluxed at a higher temperature. A known device, such as an autoclave, can be used therefor.

Adding Step

In an adding step, a hydrolysis liquid of alkyl silicate (preferably tetramethyl orthosilicate) (hereinafter simply referred to as a "hydrolysis liquid") is added to the above-mentioned mother liquid.

The hydrolysis liquid is prepared by hydrolysis of an alkyl silicate with pure water. When tetramethyl orthosilicate is used as the alkyl silicate, an equimolar amount or more of water relative to methoxy group is added so as to allow the following reaction to be performed, and to thereby prepare an active silicic acid solution.

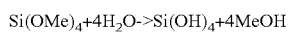

$$Si(OMe)_4 + 4H_2O \rightarrow Si(OH)_4 + 4MeOH$$

wherein Me represents a methyl group.

The hydrolysis liquid of alkyl silicate may be prepared using a known method by, for example, adding an alkyl silicate to water, and stirring the resulting mixture. In the thus-obtained reaction liquid, hydrolysis progresses within about 1 to 2 hours, and a desired hydrolysis liquid can thereby be prepared.

The hydrolysis of an alkyl silicate yields nonvolatile silicic acid oligomers. This is advantageous because the particle growth reaction can be performed at a higher temperature, allowing denser particles to be prepared.

The amount of an alkyl silicate added to water is adjusted so that a final silica concentration of the hydrolysis liquid is generally 1 to 20 wt. %, preferably 1 to 10 wt. %, and more preferably 1 to 6 wt. %. Thereby, silica particles are allowed to effectively grow while the alkyl silicate hydrolysis liquid is prevented from turning into a gel.

Further, in the present invention, a water-soluble organic solvent may be added, where required, as a compatibilizing solvent, to the reaction liquid, in place of a part of water, in order to render the alkyl silicate compatible with water. The water-soluble organic solvent may be, for example, an alcohol. Specific examples thereof include lower alcohols (in particular, alcohols having a carbon number of from 1 to 3) such as methanol, ethanol, isopropanol, and the like. Although the amount of the water-soluble organic solvent contained in a reaction liquid is not limited, it is usually 0 to 90 wt. %, preferably about 0 to about 50 wt. %.

The alkyl silicate hydrolysis liquid is low in storage stability. Therefore, the alkyl silicate hydrolysis liquid may be prepared, depending on the solids content concentration, every 2 to 10 hours, or continuously, while continuing the supply thereof to the mother liquid. The storage stability can be improved by adding the foregoing compatibilizing solvent. Therefore, while also taking this respect into consideration, the amount of the compatibilizing solvent added is determined. In addition, since a hydrolysis liquid stored at a lower temperature has increased stability, it is also effective to cool the prepared hydrolysis liquid to such an extent that the hydrolysis liquid does not freeze.

In the present invention, the hydrolysis may be performed either in the presence or absence of a catalyst. When a catalyst is used, an inorganic acid or organic acid, such as sulfuric acid, hydrochloric acid, nitric acid, acetic acid, or the like, or a solid acid such as strongly acidic cation exchange resins or the like, may be utilized as an acid catalyst. In the present invention, hydrolysis is preferably performed in the absence of a catalyst from the viewpoint of avoiding the introduction of anion impurities, such as $Cl^-$, $NO_3^-$, $SO_4^{2-}$, and the like. In particular, tetramethyl orthosilicate (TMOS) is easily hydrolyzed even at ordinary temperature in the absence of a catalyst, and can reduce the amount of the corrosive anion impurities to less than 1 ppm.

In the present invention, the step of adding the hydrolysis liquid of alkyl silicate to the mother liquid specifically sequentially comprises: A) step 1 of adding the hydrolysis liquid until the pH of the resulting liquid mixture becomes less than 7; B) step 2 of adding an aqueous alkali solution until the pH of the liquid mixture becomes 7 or more; and C) step 3 of adding the hydrolysis liquid while maintaining the pH of the liquid mixture at 7 or more. In other words, the step of adding the hydrolysis liquid of alkyl silicate to the mother liquid has a feature in that the hydrolysis liquid is added to an alkaline mother liquid to adjust the pH of the liquid mixture once to less than 7 (the acidic region); an aqueous alkali solution is then added to adjust the pH of the liquid mixture back to 7 or more; and thereafter, while the pH is maintained at 7 or more (i.e., while adding the aqueous alkali solution), the addition of the hydrolysis liquid is continued. In the step of adding an aqueous alkali solution to adjust the pH of the liquid mixture back to 7 or more (step 2), it is preferable that the addition of the hydrolysis liquid is stopped, or that a small amount of the hydrolysis liquid is added. Hereinafter, each step is described.

In step 1, the hydrolysis liquid is added until the pH of the liquid mixture is lowered to less than 7. Although the lower limit of the pH value is not limited, the pH is preferably 6 or more, so as to inhibit excessive gelation of the liquid mixture. That is, in step 1, the pH of the liquid mixture is preferably adjusted to 6 or more and less than 7, and more preferably 6.3 or more and less than 7. If the pH is unduly lowered, the filtration performance is degraded, the viscosity increases, and gelation occurs; however, the deformation degree of the particles will be larger.

In the production process of the present invention, it is presumed that seed particles are first formed in the mother liquid containing water and an alkali catalyst, after which the particles start growing. The number of the seed particles formed is determined in accordance with the amount (the concentration) of the hydrolysis liquid of alkyl silicate added in an initial stage. Therefore, the ratio of the mother liquid charged weight to the addition rate of the hydrolysis liquid of alkyl silicate, in step 1, serves as a parameter. The addition rate of the hydrolysis liquid may be adjusted to a rate that is sufficient enough to obtain dense silica particles, although this rate varies depending on the concentration of the hydrolysis liquid, desired diameter of the colloidal particles, etc. The addition rate is preferably 0.7 to 41 g of silica/hour/kg of mother liquid. The term "g of silica" used herein refers to the weight of the silica, and the term "kg of mother liquid" refers to the weight of the mother liquid. If the addition rate is fast, the number of seed particles formed will increase, and the particles will have a smaller diameter when the pH is shifted to acidic. Therefore, the deformation degree becomes larger, while the pH control becomes difficult. As described above, if the particle diameter is too small, the deformation will be insufficient during the particle growth process. In contrast, if the addition rate is slow, the number of seed particles formed will decrease, and the particles will have a larger diameter when the pH is shifted to acidic. Therefore, the deformation degree is lowered, while the pH is easily controlled. The addition rate in step 1 may be determined in consideration of the above.

In step 2, an aqueous alkali solution is added until the pH of the liquid mixture increases to 7 or more. Examples of the usable aqueous alkali solutions include alkali metal hydroxide, and like organic amines that do not readily vaporize at the boiling point of water. It is preferable to avoid using NaOH, LiOH, and the like, which cause pollution. Specifically, TMAH is preferably used. Steps 1 and 2 are preferably performed in such a manner that the pH of the liquid mixture is kept at less than 7 for a duration of 0.5 to 5 hours. In step 2, the addition of the hydrolysis liquid may or may not be performed. Specifically, the hydrolysis liquid is added in step 1 to lower the pH to the predetermined value, the addition of the hydrolysis liquid is then stopped, and the pH is kept acidic for a predetermined period of time to cause aggregation of seed particles. Subsequently, an aqueous alkali solution is added to shift the pH to alkaline again. The aqueous alkali solution may be added gradually, or all at once.

In step 3, the hydrolysis liquid is added while maintaining the pH of the liquid mixture at 7 or more. Here, it is preferable that the addition of the hydrolysis liquid is resumed while an aqueous alkali solution is added. The addition rate of the hydrolysis liquid is preferably 0.7 to 41 g of silica/hour/kg of mother liquid. The hydrolysis liquid of alkyl silicate is continuously added to the mother liquid until the colloidal particles grow to have a desired particle diameter. Due to the particle growth, the colloidal silica of the present invention containing silica secondary particles having a bent structure and/or a branched structure can be obtained. When the addition rate is exceedingly fast, silanol groups remain, and the particles grow before a dense structure is formed, which causes an increased number of residual silanol groups. As a result, the peak area value of $^{29}$Si CP/MAS NMR increases. It is further assumed that deposition on each of the particle surfaces cannot be performed in time, and fine particles are newly formed, which leads to a wide distribution of particle sizes, resulting in an increased CV value calculated using the following formula (1), or resulting in the occurrence of gelation throughout the entire product.

$$CV=(SD/D)\times 100 \tag{1}$$

wherein SD represents a standard deviation, and D represents an average particle diameter.

Therefore, an exceedingly fast addition rate also causes deterioration of other properties, such as filterability, etc. In contrast, when the addition rate is slow, the productivity is decreased, which, while uneconomical, results in denser particles. The addition rate in step 3 may be changed. By reducing the addition rate near the end of the addition step, in particular, the number of silanol group remaining on the surface of particles can be reduced, denser particles can be prepared, and a particle diameter can be accurately controlled.

The addition of the hydrolysis liquid is halted when colloidal particles having a desired particle diameter are produced. If required, the alcohol remaining in the reaction liquid may be removed by distillation or the like. In such a case, a decrease of the reaction temperature can be prevented by continuously removing the water-soluble organic solvent (alcohol etc.). It is preferable to promptly distill excess amounts of the water-soluble organic solvent (alcohol etc.) out of the reaction system, because the presence of a large amount of the water-soluble organic solvent (alcohol etc.) in the adding step interferes with the deposition of silica by, for example, causing dissolution of the silicic acid. By distilling excess water-soluble organic solvent out of the reaction system, the concentration, described below, can be performed simultaneously therewith. The reaction liquid can be concentrated to a solids content of 25% or more when the reaction is completed.

Subsequently, the reaction liquid is concentrated, if required. Prior to the concentration, a minute amount of the water-soluble organic solvent (alcohol etc.), which remains in the reaction system, may be removed, if required.

The reaction liquid may be directly subjected to a concentration to a desired solids content after the following are confirmed: the temperature (the temperature in the reaction system) reaches 100° C.; the vapor temperature also reaches 100° C.; and the removal of the water-soluble organic solvent is completed. Examples of usable concentration methods include known concentration methods such as concentration by distillation, membrane concentration, and the like. The resulting concentrate can be directly used for various purposes after being filtrated through a predetermined filter to remove coarse particles, foreign bodies, and the like.

EXAMPLES

Hereinafter, the present invention is described in further detail with reference to the Examples and Comparative Examples. However, the present invention is not limited thereto.

Example 1

228 g of tetramethyl orthosilicate (TMOS) was measured and transferred into an Erlenmeyer flask (volume: 3 L), to which 2,772 g of pure water was added at ordinary temperature with stirring. The obtained reaction liquid was opaque at the beginning, and, after 5 minutes, became transparent and homogeneous as the hydrolysis progressed. The reaction was continued as is for 1 hour, and a TMOS hydrolysis liquid having a silica content of 3 wt. % was thereby prepared. The pH of the hydrolysis liquid was about 4.4 due to the acidic silanol groups produced during the hydrolysis.

2,000 g of pure water and 2 g of 1N TMAH (tetramethyl ammonium hydroxide) were added into a four-necked flask (5 L) equipped with a feed tube, a stirrer, and a packed column (filled with 5 mm glass Raschig ring; filling height: 30 cm) provided with a thermometer and a reflux head, so as to yield a mother liquid. The pH of the mother liquid was 10.70. When the mother liquid was heated to reflux, feeding of the TMOS hydrolysis liquid commenced. The addition rate was 16 mL/minute (14.2 g of silica/hour/kg of mother liquid).

Figure 1:
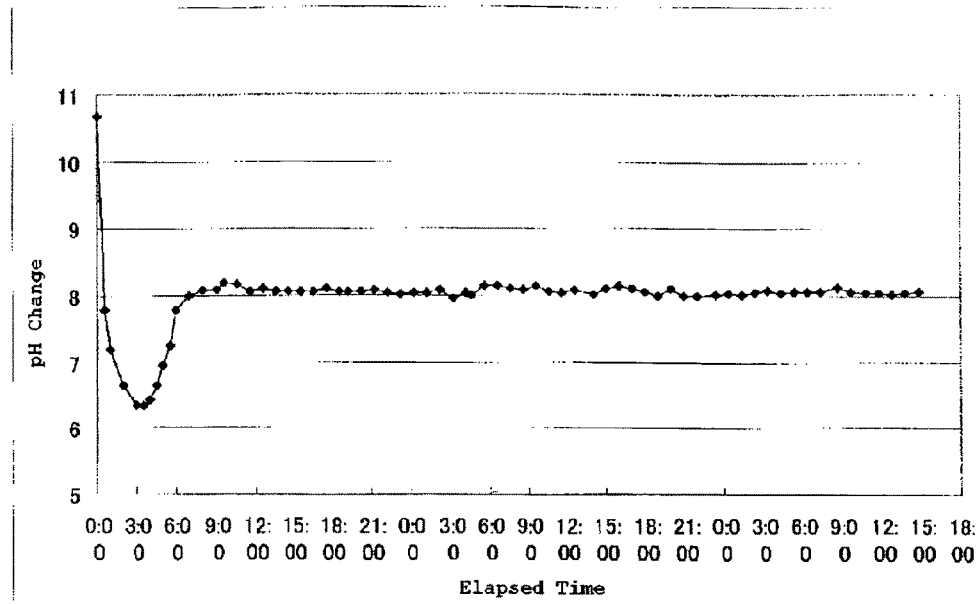
FIG. 1 is a graph showing pH change observed in Example 1.

When the pH was lowered to 6.35, 1N TMAH was gradually added to adjust the pH to about 8. Thereafter, the addition of the hydrolysis liquid was continued, while the aqueous 1N TMAH solution was appropriately added to maintain the pH value. The hydrolysis liquid was prepared every 3 hours, 20 times in total. FIG. 1 shows the pH change.

After the completion of the particle growth, the resulting product was subjected to coarse filtration through a 90 μm mesh filter. Then, after water displacement, the resulting product was heated and concentrated to a solids content of 20%. Thereafter, the concentrated product was filtered through a 3 μm membrane filter of mixed cellulose (produced by Toyo Roshi Kaisha, Ltd.). The filterability was excellent, i.e., about 1,760 g/3 μm membrane filter with a diameter of 90 mm. Table 2 shows the properties thereof. FIG. 20 shows the NMR spectrum of the obtained colloidal silica.2

TABLE 2

| Item | Example 1 |
|---|---|
| Final pH | 7.91 |
| Specific Surface Area (m²/g) | 82.2 |
| Primary Particle Diameter (nm) | 33.2 |
| Secondary Particle Diameter (nm) | 71.0 |
| Standard Deviation | 24.0 |
| Aggregate | 2.14 |

TABLE 2-continued

| Item | Example 1 | | | |
|---|---|---|---|---|
| Ratio*[1] | | | | |
| Specific Gravity | 1.125 | | | |
| Electric Conductivity (μS/cm) | 95.3 | | | |
| Kinematic Viscosity (mm²/s) | 13.2 | | | |
| Silica Content (%) | 20.41 | | | |
| Solid-State $^{29}$Si-CP/MAS-NMR Peak Strength Ratio | | Si(OH)$_2$ 3 | Si(OH)$_1$ 42 | Si(OH)$_0$ 55 | Peak Area Value 11.3 |
| Example 1: SEM Image | See FIG. 10 | | | |
| Absolute Specific Gravity | 2.2 | | | |
| Ratio of Bent/Branched Particle Structure | 35.4% (17/48) | | | |
| CV Value | 33.8 | | | |
| Average Aspect Ratio*[2] | 2.35/38 | | | |
| Metal Impurities (ppb) | | | | |
| Sodium | 191.9 | | | |
| Potassium | 33.8 | | | |
| Iron | 2.1 | | | |
| Aluminium | 65.5 | | | |
| Calcium | 53.4 | | | |
| Magnesium | 19.0 | | | |
| Titanium | 36.50 | | | |
| Nickel | 0.2 | | | |
| Chromium | <0.1 | | | |
| Copper | 1.0 | | | |
| Zinc | 18.3 | | | |
| Lead | 0.43 | | | |
| Silver | <0.05 | | | |
| Cobalt | <0.1 | | | |
| Manganese | <0.1 | | | |

*[1]Aggregate Ratio refers to a value obtained by a secondary particle diameter/primary particle diameter.
*[2]Average Aspect Ratio refers to an average value of major-axis/minor-axis ratios with respect to particles whose sizes are measurable from SEM images. The number of the particles measured is also shown.

Comparative Example 1

A 5 L four-necked flask was placed in a mantle heater; afterward, a stirrer, a 30 cm Raschig ring column with a reflux head, a feed pump and a thermometer were attached thereto. Then, 1 L of pure water and 2 g of an aqueous 1N TMAH solution were poured thereinto, and heated to reflux.

A hydrolysis liquid prepared by adding 693 g of pure water to 57 g of TMOS, and stirring the resulting mixture at ordinary temperature for 1 hour was added thereto dropwise at a rate of 4 mL/minute. An active silicic acid solution was prepared every 3 hours, 21 times in total (silica content: 467 g), and was added dropwise at a rate of 8 mL/minute using a tube pump (one piece of Tygon tubing having an internal diameter of 2 mm, and a graduation of 8). The time required for the dropwise addition was about 60 hours (dropwise addition rate: 7.78 g of silica/hour/kg of mother liquid). During the dropwise addition, the methanol-water mixed solution was continuously removed by distillation while the reaction temperature was maintained, and the concentration and water displacement were carried out. The silica concentration after the completion of the dropwise addition was about 10 wt. %.

After the completion of the dropwise addition, the removal by distillation was continued under heating for 30 minutes for aging.

Figure 2:
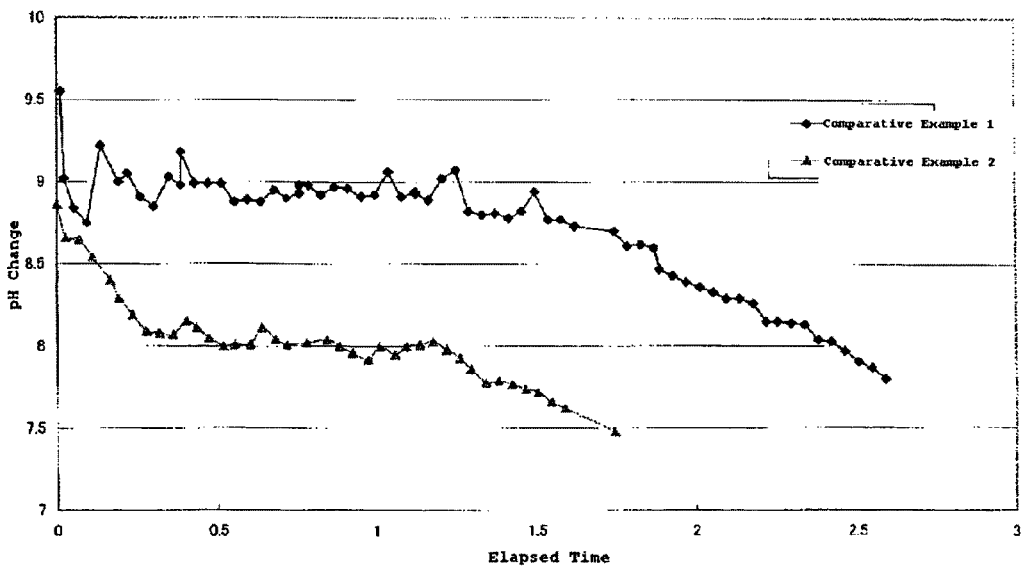
FIG. 2 is a graph showing pH changes observed in Comparative Examples 1 and 2.

2 g each of an aqueous 1N TMAH solution was added thereto every one hour to maintain the pH at around 9.0, without allowing the pH to shift to acidic, during the first half of the reaction. In the last half of the reaction, the addition of TMAH was not performed; accordingly, the pH was lowered to about 7.5. FIG. 2 shows the pH change.

After the completion of particle growth, the resulting product was subjected to coarse filtration through a 90 μm mesh filter, and concentrated to a solids content of 20% using an ultrafiltration membrane with a molecular weight cutoff of 100,000. Thereafter, the concentrated product was filtered through a 3 μm membrane filter of mixed cellulose. The filterability was excellent, i.e., about 1,800 g/3 μm membrane filter with a diameter of 90 mm. Table 3 shows the properties thereof. FIG. 21 shows the NMR spectrum of the obtained colloidal silica.

TABLE 3

Figure 11:
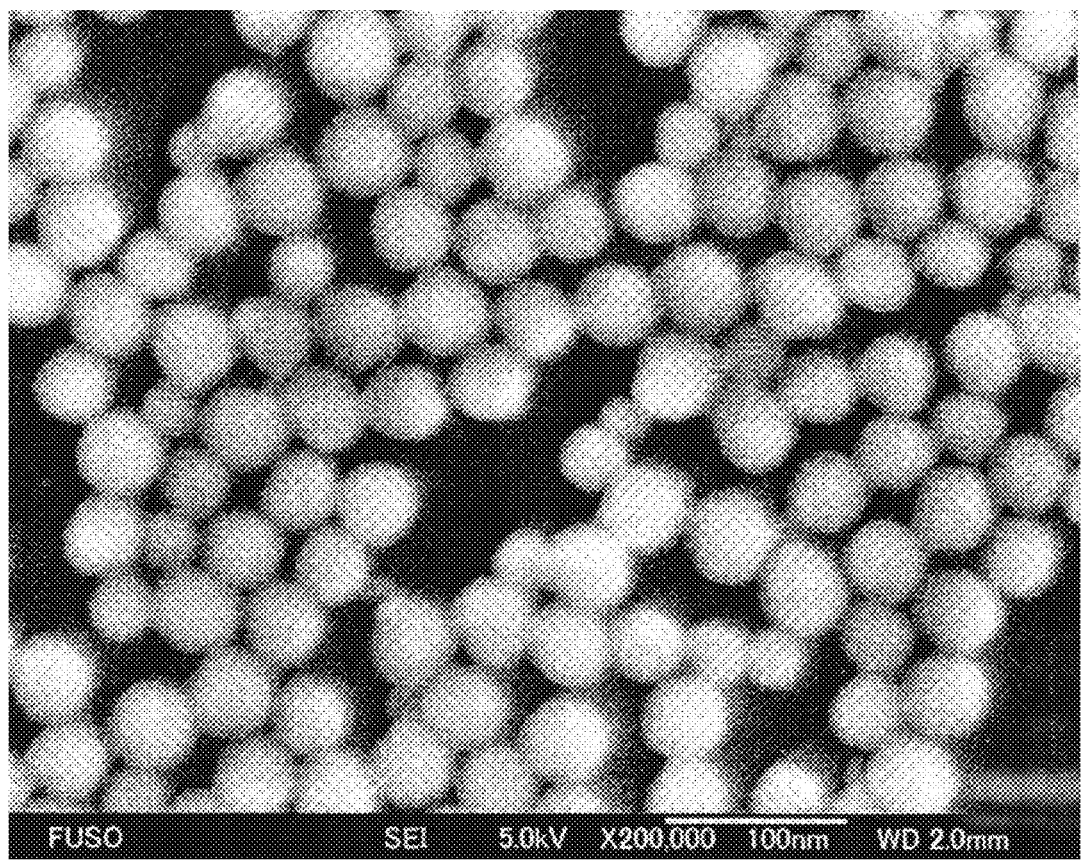
FIG. 11 is a scanning electron microscope (SEM) observation image of the colloidal silica obtained in Comparative Example 1.

| Item | Comparative Example 1 | | | |
|---|---|---|---|---|
| Final pH | 7.54 | | | |
| Specific Surface Area (m$^2$/g) | 71.70 | | | |
| Primary Particle Diameter (nm) | 36.5 | | | |
| Secondary Particle Diameter (nm) | 46.4 | | | |
| Standard Deviation | 17.4 | | | |
| Aggregate Ratio | 1.27 | | | |
| Specific Gravity | 1.123 | | | |
| Electric Conductivity (μS/cm) | 72.2 | | | |
| Kinematic Viscosity (mm$^2$/s) | 10.3 | | | |
| Silica Content (%) | 20.12 | | | |
| Solid-State $^{29}$Si-CP/MAS-NMR Peak Strength Ratio | Si(OH)$_2$ 3 | Si(OH)$_1$ 44 | Si(OH)$_0$ 53 | Peak Area Value 11.4 |
| Comparative Example 1: SEM Image | See FIG. 11 | | | |
| Absolute Specific Gravity | 2.2 | | | |
| Ratio of Bent/Branched Particle Structure | 0% (0/100) | | | |
| CV Value | 37.5 | | | |
| Average Aspect Ratio | 1.1/100 | | | |
| Metal Impurities (ppb) | | | | |
| Sodium | 671.4 | | | |
| Potassium | 107.2 | | | |
| Iron | 12.1 | | | |
| Aluminium | 99.9 | | | |
| Calcium | 305.4 | | | |
| Magnesium | 72.2 | | | |
| Titanium | 2.82 | | | |
| Nickel | 0.5 | | | |
| Chromium | <0.1 | | | |
| Copper | 2.2 | | | |
| Zinc | 28.8 | | | |
| Lead | 0.40 | | | |
| Silver | <0.05 | | | |
| Cobalt | <0.2 | | | |
| Manganese | 0.6 | | | |

Comparative Example 2

2,666.8 g of PL-2H (silica content: 533 g), an equivalent amount of pure water, and 30.44 g of 1N TMAH were transferred into a 10 L flask equipped with a stirrer, a thermometer, a feed tube, and a 30 cm Raschig ring column with a reflux head. The mixture was heated by a mantle heater under stirring to reflux.

A hydrolysis liquid prepared by adding 2,772 g of pure water to 228 g of TMOS, and stirring the resulting mixture at ordinary temperature for 1 hour was added thereto dropwise at a rate of 16 mL/minute using a tube pump (two pieces of Tygon tubing having an internal diameter 2 mm and a graduation of 8). The hydrolysis liquid was prepared every 3 hours, 12 times in total (silica content:1,067 g), and added dropwise. The ratio of the seed particles to the active silicic acid (silica) added was adjusted to 1:2. The time required for the dropwise addition was about 40 hours. During the dropwise addition, the methanol-water mixed solution was continuously removed by distillation while the reaction temperature was maintained, and the concentration and water displacement were carried out. The silica concentration after the completion of the dropwise addition was about 18 wt. %.

An aqueous 1N TMAH solution was added at a rate of 2 g/hour so as to maintain the pH at about 8.0 until two-thirds of the hydrolysis liquid was added. Thereafter, without performing the addition, the pH was lowered to about 7.5. FIG. 2 shows the pH change.

After the completion of the dropwise addition, the removal by distillation was continued under heating for 30 minutes for aging. The additional distilled-off amount was determined through a calculation based on the dry residue at 150° C., and the concentration was performed by a distillation method. Table 4 shows the properties. FIG. 22 shows the NMR spectrum of the obtained colloidal silica. FIG. 26 shows the NMR spectrum of the seed particles used.

TABLE 4

| Item | Comparative Example 2 | | | |
|---|---|---|---|---|
| Final pH | 7.40 | | | |
| Specific Surface Area (m$^2$/g) | 76.1 | | | |
| Primary Particle Diameter (nm) | 36.9 | | | |
| Secondary Particle Diameter (nm) | 74.7 | | | |
| Standard Deviation | 30.4 | | | |
| Aggregate Ratio | 20.8 | | | |
| Specific Gravity | 1.122 | | | |
| Electric Conductivity (μS/cm) | 56.6 | | | |
| Kinematic Viscosity (mm$^2$/s) | 22.9 | | | |
| Silica Content (%) | 20.0 | | | |
| Solid-State $^{29}$Si-CP/MAS-NMR | Si(OH)$_2$ 2 | Si(OH)$_1$ 51 | Si(OH)$_0$ 45 | Peak Area |

TABLE 4-continued

Figure 12:
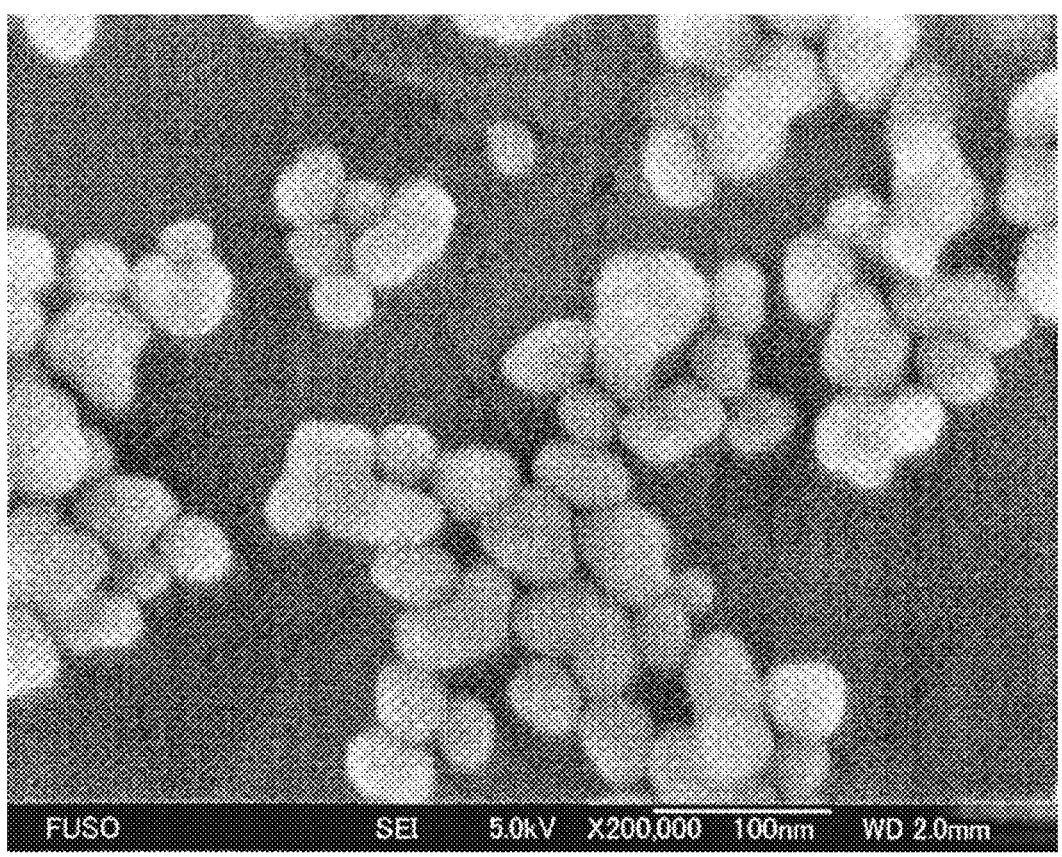
FIG. 12 is a scanning electron microscope (SEM) observation image of the colloidal silica obtained in Comparative Example 2.

| Item | Comparative Example 2 |
|---|---|
| Peak Strength Ratio | Value 15.7 |
| Comparative Example 2: SEM Image | See FIG. 12 |
| Absolute Specific Gravity | 2.1 |
| Ratio of Bent/Branched Particle Structure | 18.4% (9/49) |
| CV Value | 40.7 |
| Average Aspect Ratio | 1.48/42 |
| Metal Impurities (ppb) | |
| Sodium | 777.6 |
| Potassium | 60.9 |
| Iron | 2.6 |
| Aluminium | 75.5 |
| Calcium | 84.7 |
| Magnesium | 16.9 |
| Titanium | 2.01 |
| Nickel | <0.1 |
| Chromium | <0.1 |
| Copper | 0.7 |
| Zinc | 19.7 |
| Lead | 0.28 |
| Silver | <0.05 |
| Cobalt | <0.1 |
| Manganese | 0.2 |

The peak area value of the colloidal silica obtained in Comparative Example 2 was as large as 15.7. This is because PL-2H, which is a colloidal silica (peak area value: 28.5) containing a large amount of OH, obtained through a Stöber method, was used as seed particles. The calculated value was 16.8.

Example 2

228 g of tetramethyl orthosilicate (TMOS) was measured and transferred into an Erlenmeyer flask (volume: 3 L), to which 2,772 g of pure water was added at ordinary temperature with stirring. The obtained reaction liquid was opaque at the beginning, and, after 5 minutes, became transparent and homogeneous as the hydrolysis progressed. The reaction was continued as is for 1 hour, and a TMOS hydrolysis liquid having a silica content of 3 wt. % was thereby prepared. The pH of the hydrolysis liquid was about 4.4 due to the acidic silanol groups produced during the hydrolysis.

2,000 g of pure water and 2 g of 1N TMAH were added into a four-necked flask (5 L) equipped with a feed tube, a stirrer, and a packed column (filled with 5 mm glass Raschig rings; filling height: 30 cm) provided with a thermometer and a reflux head, so as to yield a mother liquid. The pH of the mother liquid was 10.65. When the mother liquid was heated to reflux, feeding of the TMOS hydrolysis liquid commenced. The addition rate was 16 mL/minute (14.2 g of silica/hour/kg of mother liquid).

Figure 3:
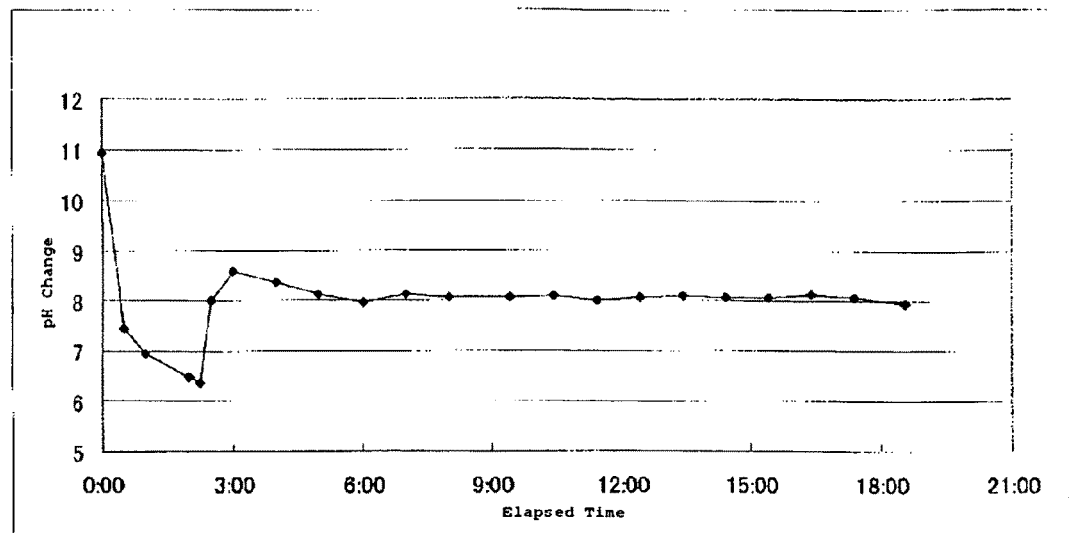
FIG. 3 is a graph showing pH change observed in Example 2.
Figure 23:
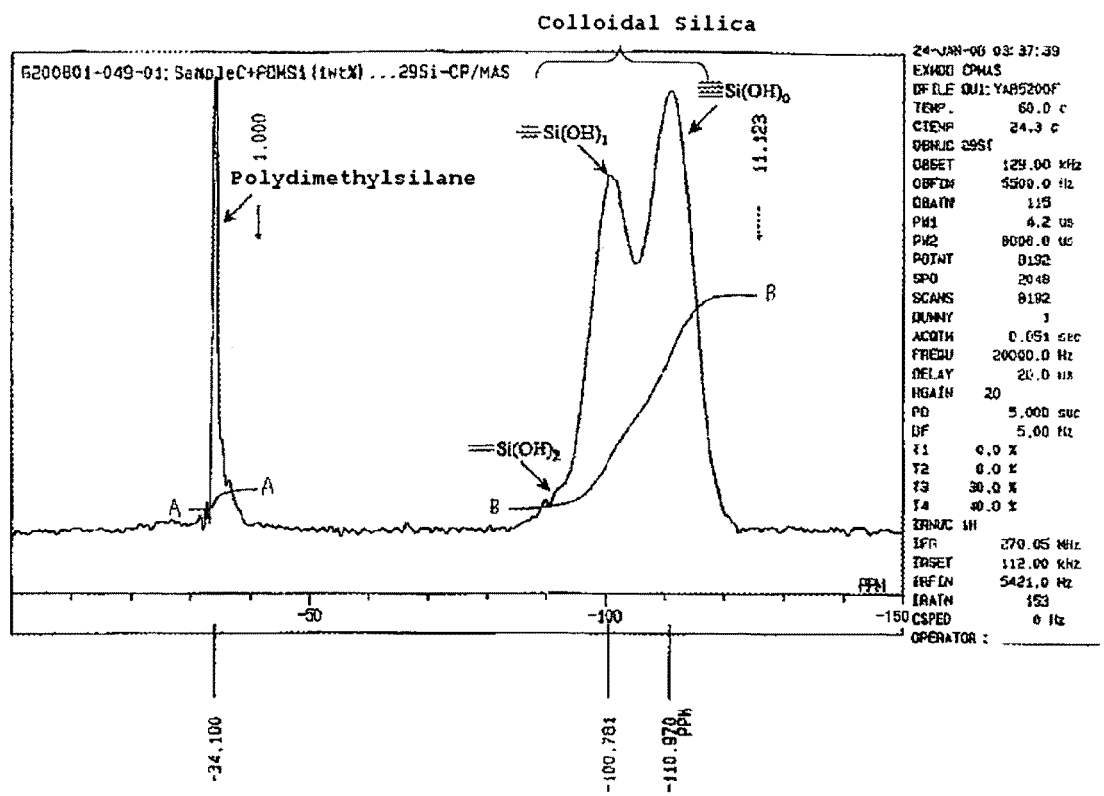
FIG. 23 is a solid-state $^{29}$Si CP/MAS NMR spectrum with respect to the colloidal silica obtained in Example 2.

Immediately after the pH was lowered to 6.35, 10 g of 1N TMAH was added to adjust the pH to about 8. Thereafter, the addition of the hydrolysis liquid was continued, while the aqueous 1N TMAH solution was appropriately added to maintain the pH value. The hydrolysis liquid was prepared every 3 hours, 6 times in total. FIG. 3 shows the pH change. Table 5 shows the properties. FIG. 23 shows the NMR spectrum of the obtained colloidal silica.

TABLE 5

| Item | Example 2 | | | |
|---|---|---|---|---|
| Final pH | 7.72 | | | |
| Specific Surface Area ($m^2/g$) | 1.130 | | | |
| Primary Particle Diameter (nm) | 21.1 | | | |
| Secondary Particle Diameter (nm) | 21.0 | | | |
| Standard Deviation | 11.9 | | | |
| Aggregate Ratio | 1.84 | | | |
| Specific Gravity | 1.130 | | | |
| Electric Conductivity (μS/cm) | 164.7 | | | |
| Kinematic Viscosity ($mm^2/s$) | 7.0 | | | |
| Silica Content (%) | 21.1 | | | |
| Solid-State $^{29}$Si-CP/MAS-NMR Peak Strength Ratio | $Si(OH)_2$ 2 | $Si(OH)_1$ 40 | $Si(OH)_0$ 57 | Peak Area Value 11.1 |
| Example 2: SEM Image | See FIG. 13 | | | |
| Absolute Specific Gravity | 2.2 | | | |
| Ratio of Bent/Branched Particle Structure | 33.0% (43/130) | | | |
| CV Value | 56.7 | | | |
| Average Aspect Ratio | 1.87/90 | | | |
| Metal Impurities (ppb) | | | | |
| Sodium | 144.6 | | | |
| Potassium | 48.2 | | | |
| Iron | 4.5 | | | |
| Aluminium | 63.6 | | | |
| Calcium | 59.2 | | | |
| Magnesium | 20.5 | | | |
| Titanium | 49.76 | | | |
| Nickel | 0.3 | | | |
| Chromium | 0.3 | | | |
| Copper | 0.3 | | | |
| Zinc | 17.5 | | | |
| Lead | 0.31 | | | |
| Silver | <0.05 | | | |
| Cobalt | 4.8 | | | |
| Manganese | 0.3 | | | |

Figure 13:
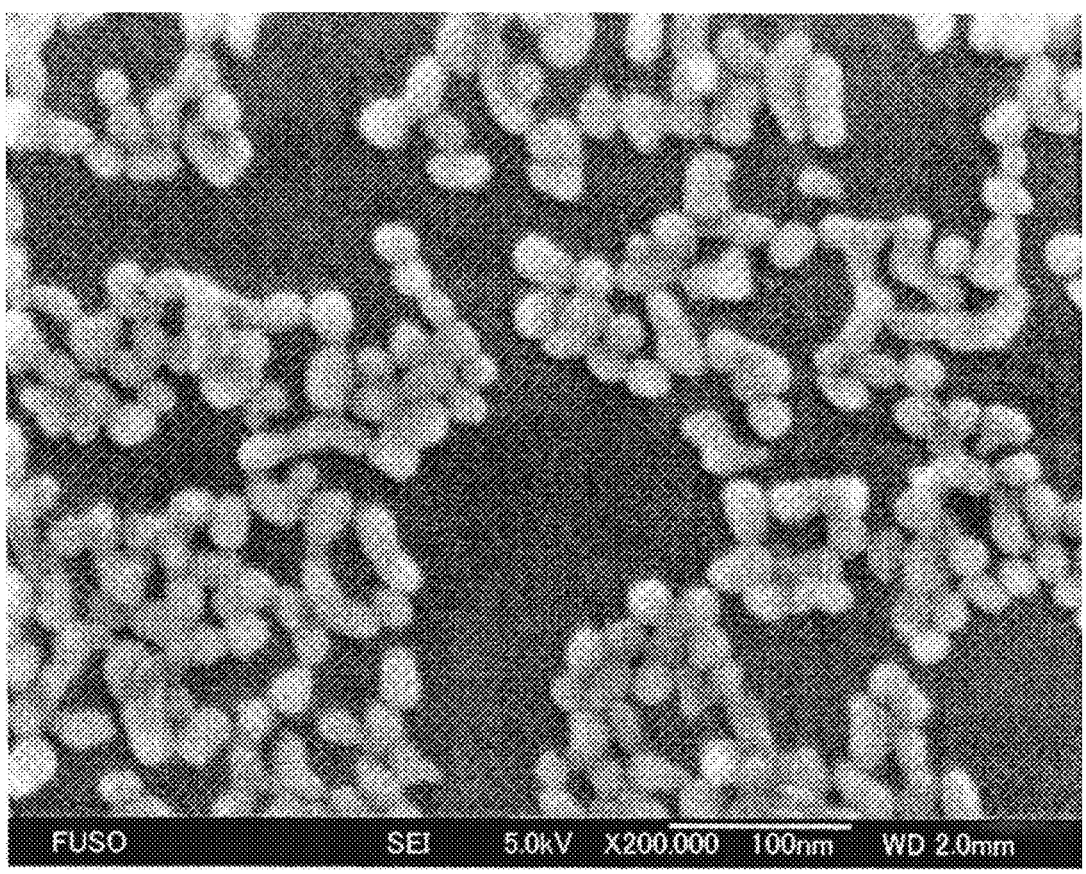
FIG. 13 is a scanning electron microscope (SEM) observation image of the colloidal silica obtained in Example 2.

The filterability was excellent, i.e., about 1,300 g/3 μm membrane filter with a diameter of 90 mm. FIG. 13 confirms that the particles having an aspect ratio that is greater than that observed in Comparative Example 2 were contained in a large amount. This shows promising beneficial effects in terms of coating properties and binding properties.

Example 3

228 g of tetramethyl orthosilicate (TMOS) was measured and transferred into an Erlenmeyer flask (volume: 3 L), to which 2,772 g of pure water was added at ordinary temperature with stirring. The obtained reaction liquid was opaque at the beginning, and, after 5 minutes, became transparent and homogeneous as the hydrolysis progressed. The reaction was continued as is for 1 hour, and a TMOS hydrolysis liquid having a silica content of 3 wt. % was thereby prepared. The pH of the hydrolysis liquid was about 4.4 due to the acidic silanol groups produced during the hydrolysis.

2,000 g of pure water and 2 g of 1N TMAH were added into a four-necked flask (5 L) equipped with a feed tube, a stirrer, and a packed column (filled with 5 mm glass Raschig rings; filling height: 30 cm) provided with a thermometer and a reflux head, so as to yield a mother liquid. When the mother liquid was heated to reflux, feeding of the TMOS hydrolysis liquid commenced. The addition rate was 16 mL/minute (14.2 g of silica/hour/kg of mother liquid).

Figure 4:
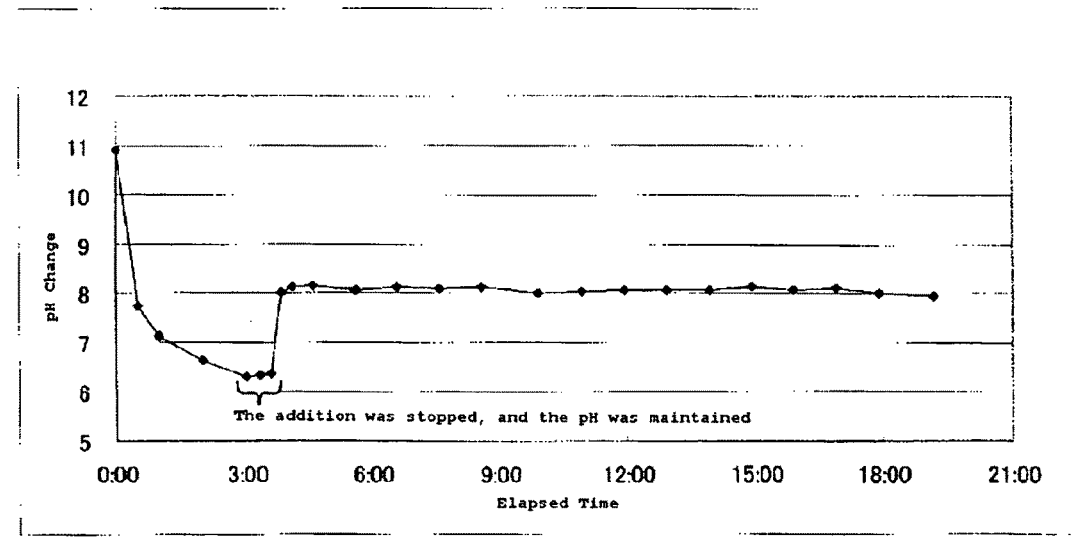
FIG. 4 is a graph showing pH change observed in Example 3.

When the pH was lowered to 6.36, the addition was stopped. After the pH was maintained in the acidic range for 30 minutes, 10 g of 1N TMAH was added to adjust the pH to about 8. Thereafter, the addition of the hydrolysis liquid was continued, while the aqueous 1N TMAH solution was appropriately added to maintain the pH value. The hydrolysis liquid was prepared every 3 hours, 6 times in total. FIG. 4 shows the pH change. Table 6 shows the properties. FIG. 24 shows the NMR spectrum of the obtained colloidal silica.

Figure 14:
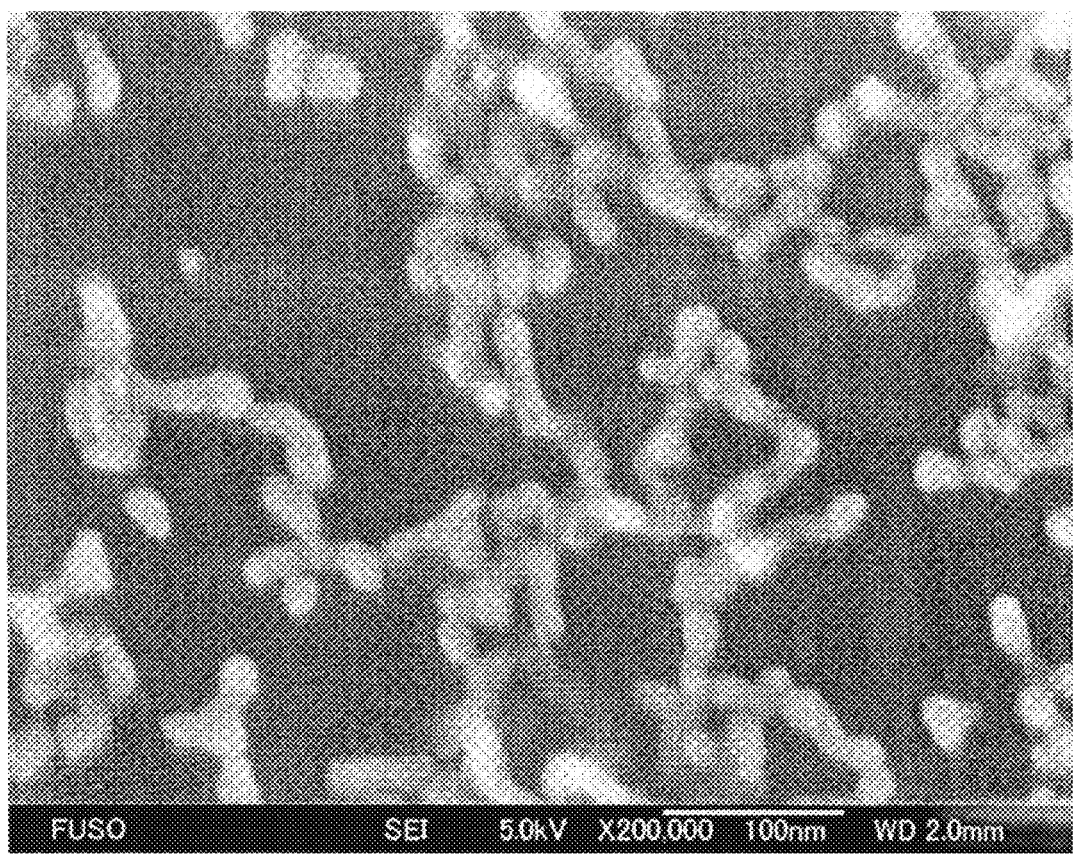
FIG. 14 is a scanning electron microscope (SEM) observation image of the colloidal silica obtained in Example 3.

FIG. 14 confirms that the particles having an aspect ratio that is greater than that observed in Example 2 were contained in a large amount. This shows promising beneficial effects in terms of coating properties and binding properties.

Example 4

The same procedure as in Example 2 was performed, except that 1N TMAH was replaced with 1N TEA (triethanolamine). The pH of the mother liquid was 9.28.

Figure 5:
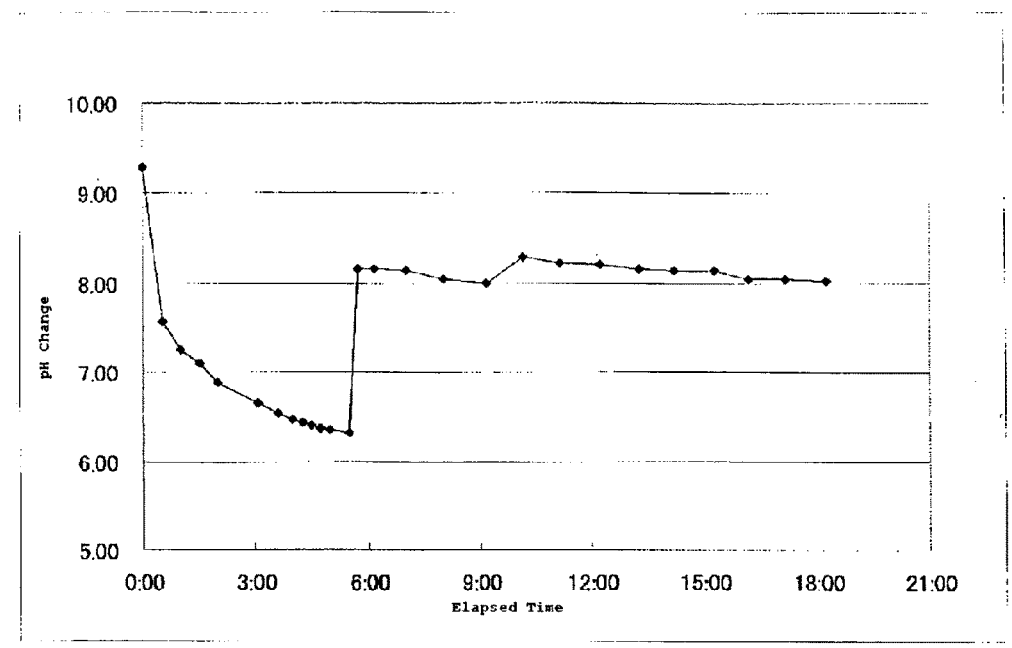
FIG. 5 is a graph showing pH change observed in Example 4.

When the pH was lowered to 6.33, 30 g of 1N TEA was added to increase the pH to about 8. Thereafter, the addition of hydrolysis liquid was continued, while the aqueous 1N TEA solution was appropriately added to maintain the pH value. FIG. 5 shows the pH change. Table 7 shows the properties. FIG. 25 shows the NMR spectrum of the obtained colloidal silica.

TABLE 6

| Item | Example 3 | | | |
|---|---|---|---|---|
| Final pH | 7.70 | | | |
| Specific Surface Area (m$^2$/g) | 126.2 | | | |
| Primary Particle Diameter (nm) | 21.6 | | | |
| Secondary Particle Diameter (nm) | 61.1 | | | |
| Standard Deviation | 26.3 | | | |
| Aggregate Ratio | 2.83 | | | |
| Specific Gravity | 1.119 | | | |
| Electric Conductivity (μS/cm) | 131.8 | | | |
| Kinematic Viscosity (mm$^2$/s) | 18.6 | | | |
| Silica Content (%) | 19.6 | | | |
| Solid-State $^{29}$Si-CP/MAS-NMR Peak Strength Ratio | Si(OH)$_2$ 3 | Si(OH)$_1$ 43 | Si(OH)$_0$ 53 | Peak Area Value 10.9 |
| Example 3: SEM Image | See FIG. 14 | | | |
| Absolute Specific Gravity | 2.2 | | | |
| Ratio of Bent/Branched Particle Structure | 52.8% (28/53) | | | |
| CV Value | 43.0 | | | |
| Average Aspect Ratio | 2.81/40 | | | |
| Metal Impurities (ppb) | | | | |
| Sodium | 440.2 | | | |
| Potassium | 88.8 | | | |
| Iron | 3.6 | | | |
| Aluminium | 63.2 | | | |
| Calcium | 66.3 | | | |
| Magnesium | 17.4 | | | |
| Titanium | 4.4 | | | |
| Nickel | 0.2 | | | |
| Chromium | <0.1 | | | |
| Copper | 1.1 | | | |
| Zinc | 40.1 | | | |
| Lead | 0.44 | | | |
| Silver | <0.05 | | | |
| Cobalt | <0.1 | | | |
| Manganese | 0.2 | | | |

TABLE 7

Figure 15:
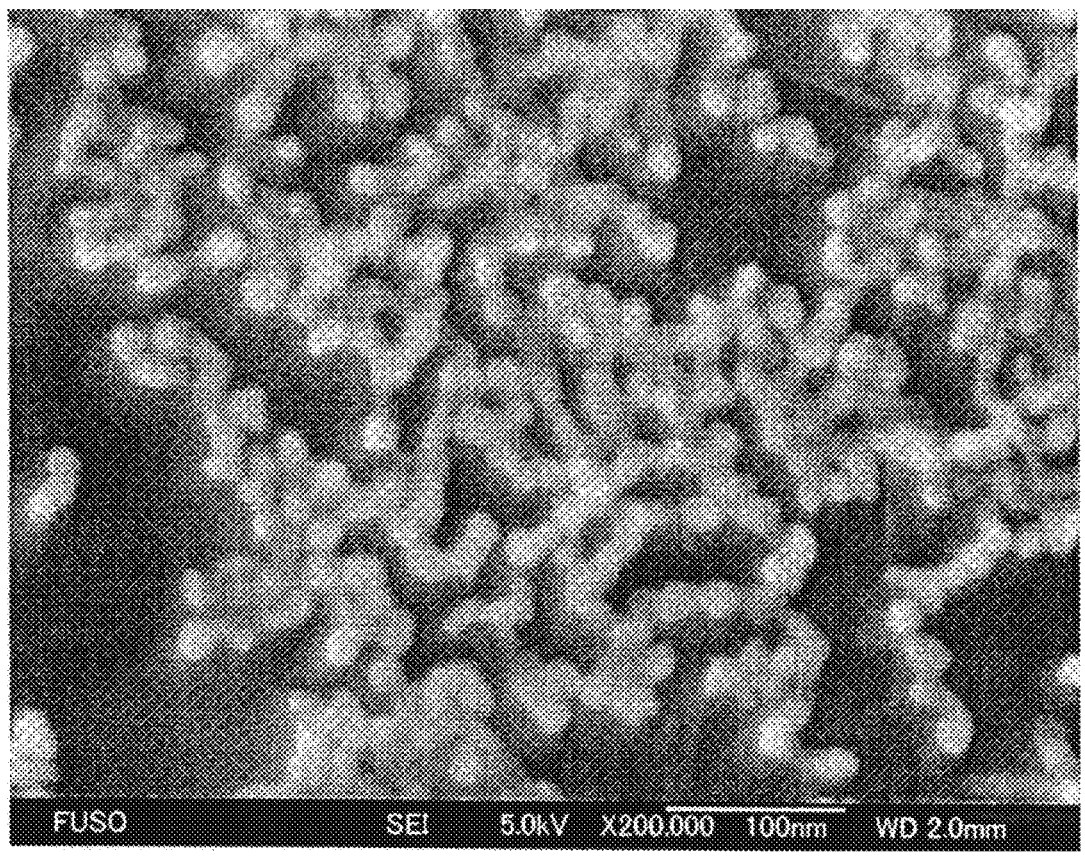
FIG. 15 is a scanning electron microscope (SEM) observation image of the colloidal silica obtained in Example 4.

| Item | Example 4 | | | |
|---|---|---|---|---|
| Final pH | 7.91 | | | |
| Specific Surface Area (m$^2$/g) | 150.1 | | | |
| Primary Particle Diameter (nm) | 18.2 | | | |
| Secondary Particle Diameter (nm) | 64.5 | | | |
| Standard Deviation | 27.4 | | | |
| Aggregate Ratio | 3.55 | | | |
| Specific Gravity | 1.129 | | | |
| Electric Conductivity (μS/cm) | 167.5 | | | |
| Kinematic Viscosity (mm$^2$/s) | 310.1 | | | |
| Silica Content (%) | 20.8 | | | |
| Solid-State $^{29}$Si-CP/MAS-NMR Peak Strength Ratio | Si(OH)$_2$ 5 | Si(OH)$_1$ 46 | Si(OH)$_0$ 49 | Peak Area Value 10.3 |
| Example 4: SEM Image | See FIG. 15 | | | |
| Absolute Specific Gravity | 2.2 | | | |
| Ratio of Bent/Branched Particle Structure | 60% (The measurement was difficult due to the complex formation) | | | |
| CV Value | 150.5 | | | |
| Average Aspect Ratio | Unmeasurable | | | |
| Metal Impurities (ppb) | | | | |
| Sodium | 257.9 | | | |
| Potassium | 70.1 | | | |
| Iron | 1.8 | | | |
| Aluminium | 36.4 | | | |
| Calcium | 132.9 | | | |
| Magnesium | 28.5 | | | |
| Titanium | 1.27 | | | |
| Nickel | <0.1 | | | |
| Chromium | <0.1 | | | |
| Copper | 0.2 | | | |
| Zinc | 12.3 | | | |
| Lead | 0.23 | | | |
| Silver | <0.05 | | | |
| Cobalt | <0.1 | | | |
| Manganese | 0.2 | | | |

When TEA, which is a weak base, is used as an alkali, the reduction in the pH in the acidic region will be slow. Therefore, to lower the pH value to 6.33, an addition of about 1.8 times the amount of the hydrolysis liquid used in Example 2 was required. As a result, the aggregate ratio increased from 1.8 to 3.6, i.e., twice the value of the aggregate ratio obtained in Example 2. Along therewith, the kinematic viscosity was greatly increased to 310.1. However, the filterability was not particularly reduced, i.e., about 400 g/3 μm membrane filter with a diameter of 90 mm.

Comparative Examples 3-1 and 3-2

The same reaction was performed under the same conditions as in Example 2, except that 1N TMAH was not added to the mother liquid, and the number of hydrolysis liquid preparation times was adjusted as shown in Table 8.

Figure 6:
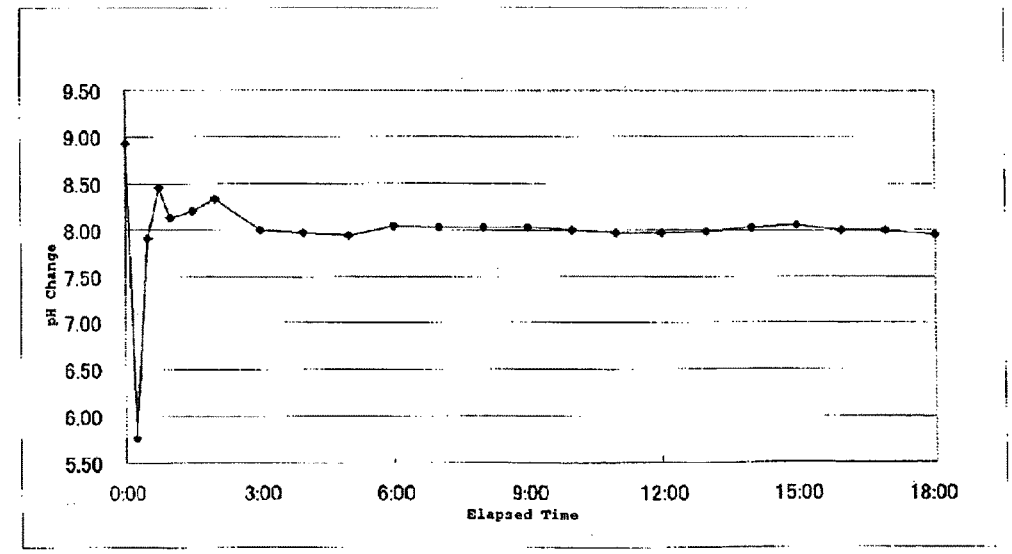
FIG. 6 is a graph showing pH change observed in Comparative Example 3-1.
Figure 7:
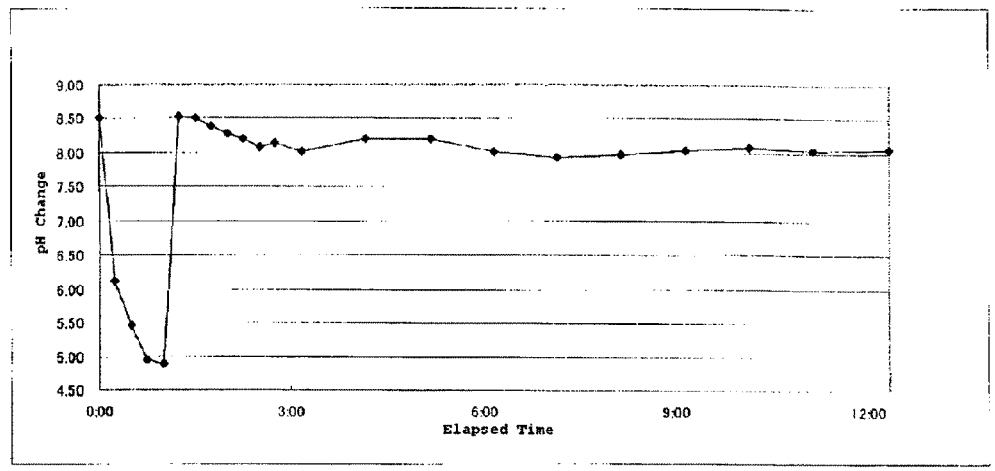
FIG. 7 is a graph showing pH change observed in Comparative Example 3-2.

Two different conditions were evaluated: one is the case where 2 g of 1N TMAH was added when the pH was lowered to 5.77 (Comparative Example 3-1); and the other is the case where 10 g of 1N TMAH was added when the pH was lowered to 4.89 (Comparative Example 3-2). FIGS. 6 and 7 show the pH changes in Comparative Example 3-1 and Comparative Example 3-2, respectively. Table 8 shows the properties and the pH values at the time of the reaction.

TABLE 8

Figure 16:
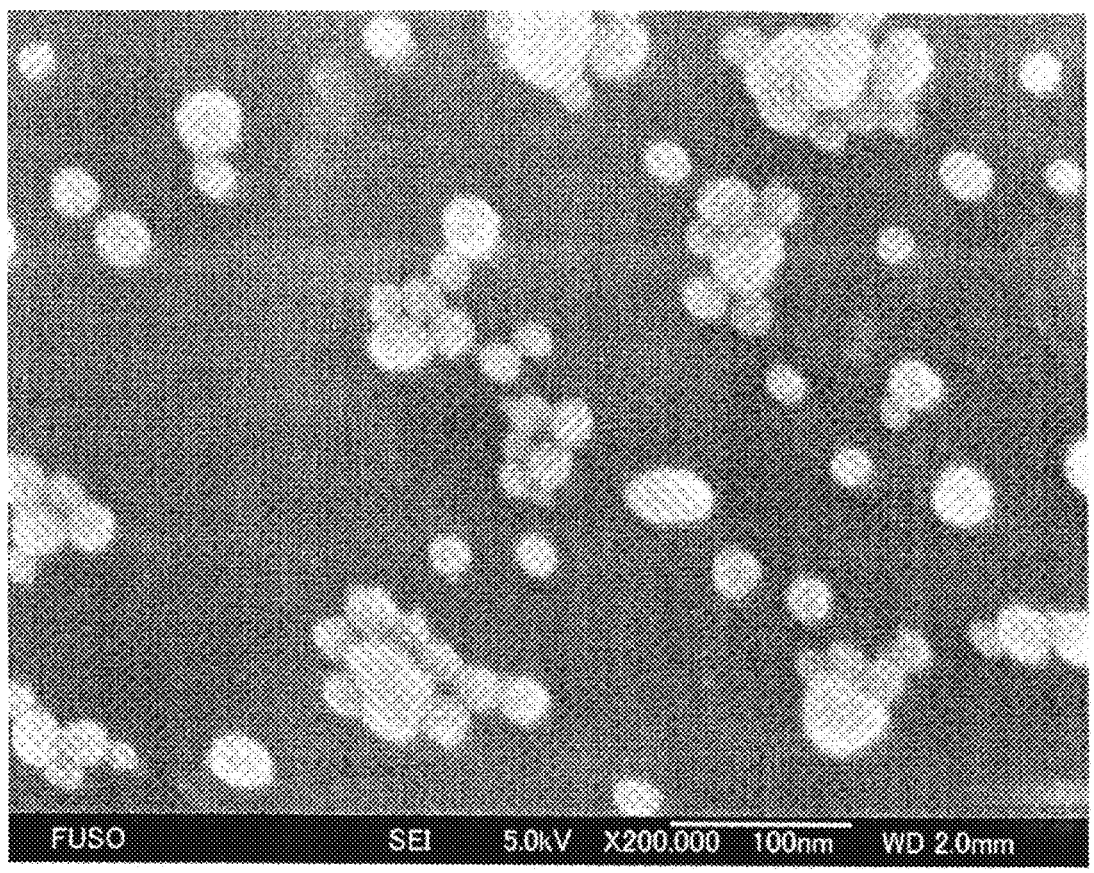
FIG. 16 is a scanning electron microscope (SEM) observation image of the colloidal silica obtained in Comparative Example 3-1
Figure 17:
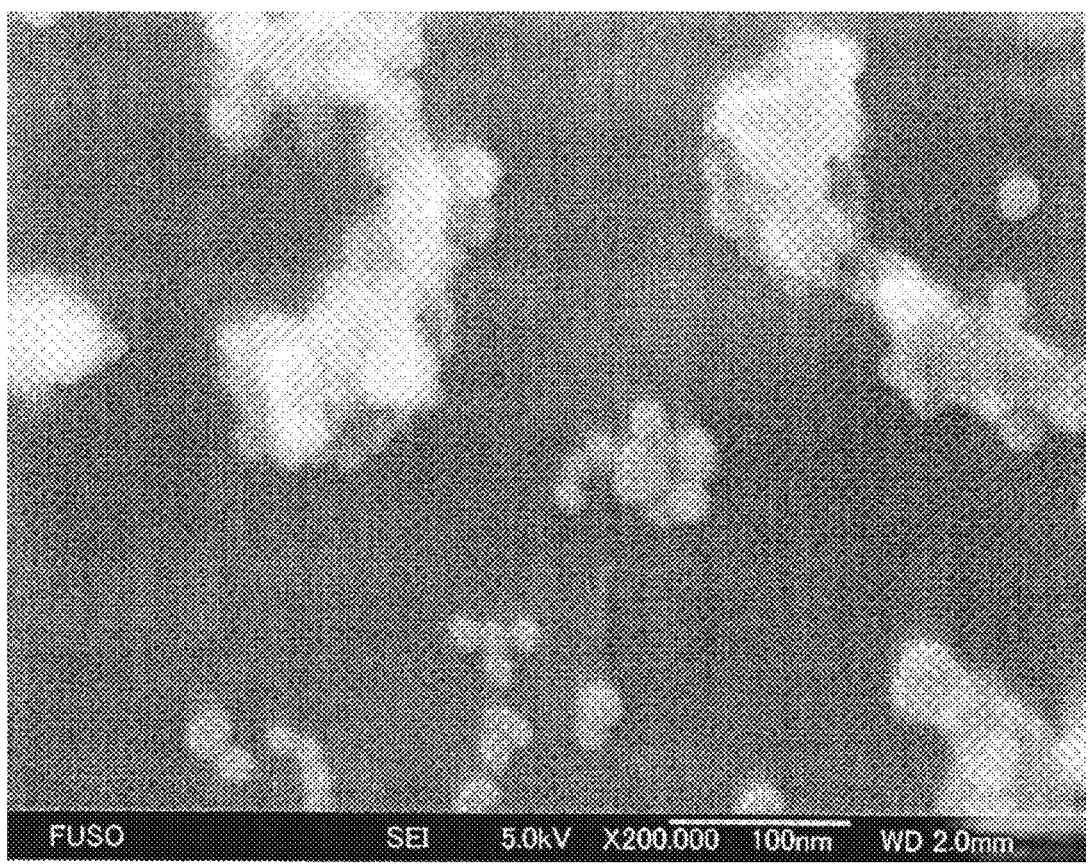
FIG. 17 is a scanning electron microscope (SEM) observation image of the colloidal silica obtained in Comparative Example 3-2.

| Item | Comparative Example 3-1 | Comparative Example 3-2 |
|---|---|---|
| Initial pH of Mother Liquid | 8.93 | 8.50 |
| Number of Hydrolyzed Liquid Preparation Times | 6 | 4 |
| Lowest pH | 5.77 | 4.89 |
| Final pH | 7.74 | 7.69 |
| Specific Surface Area (m$^2$/g) | 108.4 | 79.3 |
| Primary Particle Diameter (nm) | 25.1 | 34.4 |
| Secondary Particle Diameter (nm) | 38.4 | 116.8 |
| Standard Deviation | 13.2 | 36.6 |
| Aggregate Ratio | 1.53 | 3.19 |
| Specific Gravity | 1.119 | 1.118 |
| Electric Conductivity (μS/cm) | 130.1 | 63.6 |
| Kinematic Viscosity (mm$^2$/s) | 4.5 | 7.1 |
| Silica Content (%) | 19.6 | 19.3 |
| pH Change | FIG. 6 | FIG. 7 |
| SEM Image | See FIG. 16 | See FIG. 17 |
| Ratio of Bent/Branched Particle Structure | 0% | 0% |
| CV Value | 34.4 | 31.3 |
| Aspect Ratio | 1.19/62 | Unmeasurable |

Feeding of the hydrolysis liquid without the addition of an alkali to the mother liquid did not form silica secondary particles with a desired bent structure and/or a branched structure. It is presumed that this indicates that the formation of seed particles by the addition of an alkali to the mother liquid is necessary before the pH is shifted to acidic.

Comparative Example 4

A reaction was performed under the same conditions as in Example 2, except that 1N TMAH was added to the mother liquid in an amount of 8 g. The initial pH of the mother liquid was 11.58.

Figure 8:
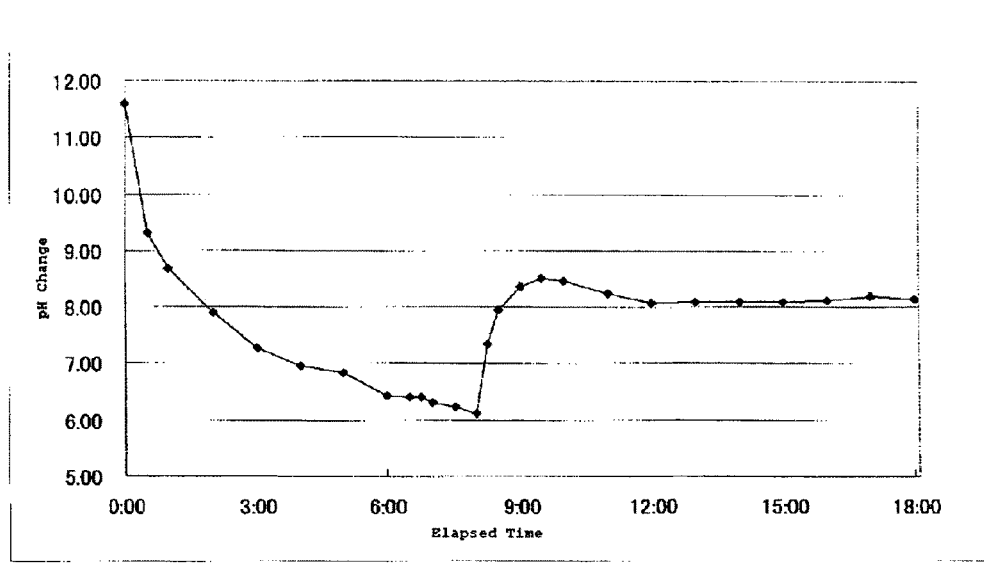
FIG. 8 is a graph showing pH change observed in Comparative Example 4.

When the pH was lowered to 6.11, 30 g of 1N TMAH was added in an amount of 10 g each every 15 minutes to increase the pH to about 8. The addition of the hydrolysis liquid was continued, while the aqueous 1N TMAH solution was appropriately added to maintain the pH. FIG. 8 shows the pH change.

TABLE 9

Figure 18:
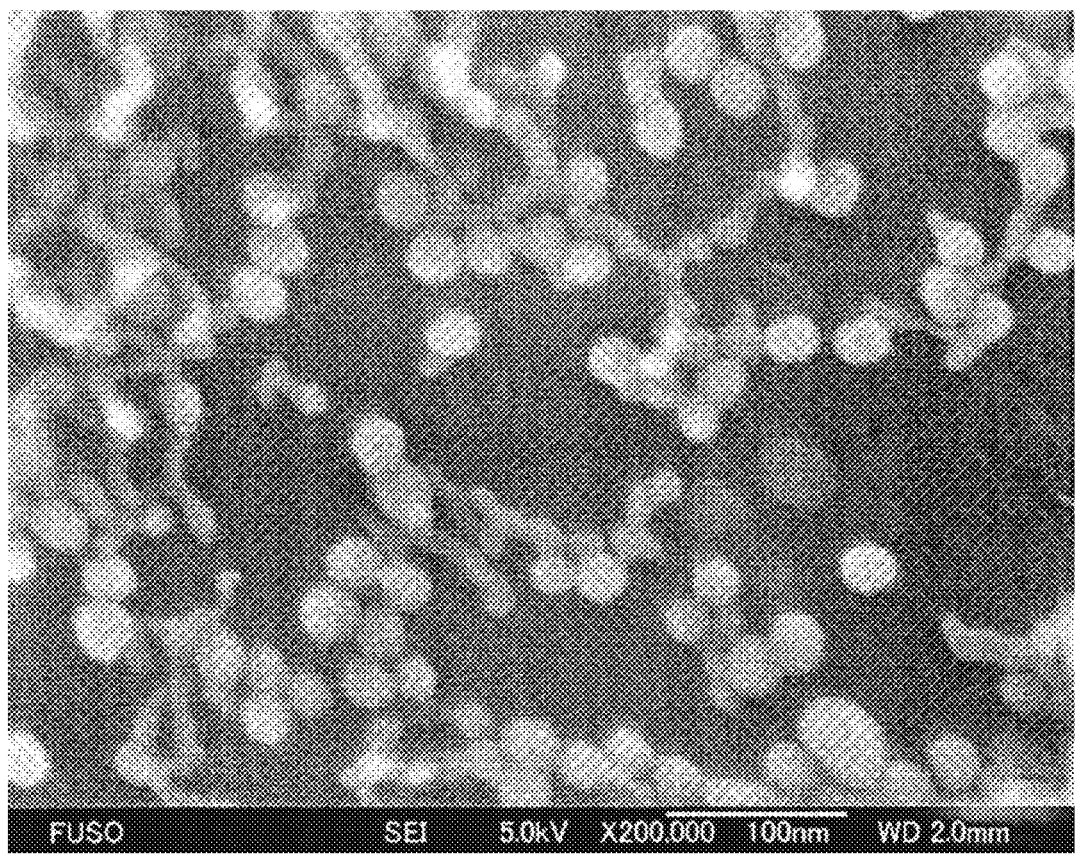
FIG. 18 is a scanning electron microscope (SEM) observation image of the colloidal silica obtained in Comparative Example 4.

| Item | Comparative Example 4 |
|---|---|
| Final pH | 8.02 |
| Specific Surface Area (m$^2$/g) | 129.9 |
| Primary Particle Diameter (nm) | 21.0 |
| Secondary Particle Diameter (nm) | 64.7 |
| Standard Deviation | 38.7 |
| Aggregate Ratio | 3.08 |
| Specific Gravity | 1.112 |
| Electric Conductivity (μS/cm) | 152.7 |
| Kinematic Viscosity (mm$^2$/s) | 53.5 |
| Silica Content (%) | 17.7 |
| Comparative Example 4: SEM Image | See FIG. 18 |
| Ratio of Bent/Branched Particle Structure | 25.3% (16/63) |
| CV Value | 59.8 |
| Average Aspect Ratio | 2.32/63 |

The filterability was considerably decreased to about 38 g/3 μm membrane filter with a diameter of 90 mm. Further, the SEM image (FIG. 18) confirms that the secondary particles having a bent and/or branched structure and spherical particles were in a mixed state, and were not uniformly deformed. It is presumed that, with the high value of the initial pH, the particles had a large diameter when the pH was acidified, causing less aggregation of the particles, which resulted in insufficient deformation of the particles. It is believed that the deformation refers to a mechanism in which particles having an appropriate size are formed in the initial alkaline state, liquefied silicate oligomers undergo crosslinking in the acidic state due to the surface tension between the particles; and when the pH is alkalized again, the solidification occurs, thereby forming deformed particles. This confirms that, in a reaction system of the present invention, the acidification to cause particle deformation must be conducted with appropriate timing and according to an appropriate state of the particles, rather than at any time.

Comparative Example 5

A reaction was performed under the same conditions as in Example 2, except that the amount of 1N TMAH contained in the mother liquid was changed to 1 g, TMOS per se was used in place of the hydrolysis liquid, the reaction temperature was changed to 80° C., and the number of the hydrolysis liquid preparation times was changed to 5. The initial pH of the mother liquid was 10.76. The feed rate was 1.23 mL/minute (14.2 g of silica/hour/kg of mother liquid), which was the same rate as the feed rate of silica employed in Example 2.

Figure 9:
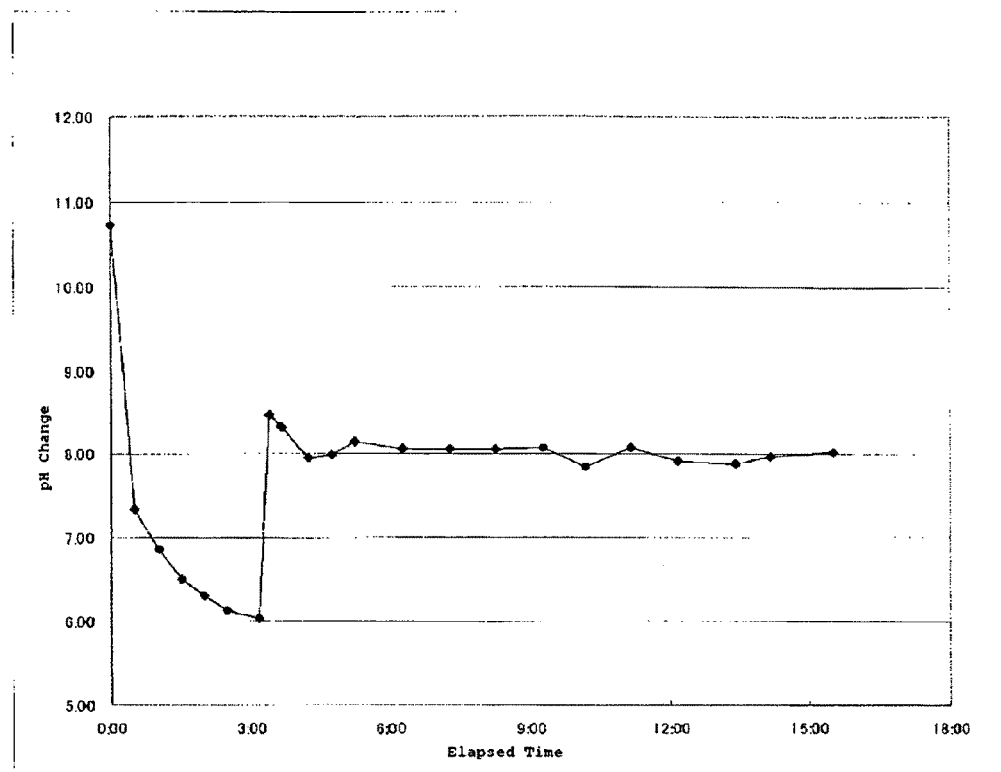
FIG. 9 is a graph showing pH change observed in Comparative Example 5.

When the pH was lowered to 6.03, 8 g of 1N TMAH was added to increase the pH to about 8. The addition of the hydrolysis liquid was continued while an aqueous 1N TMAH solution was appropriately added to maintain the pH. FIG. 9 shows the pH change. Table 10 shows the properties.

TABLE 10

| Item | Comparative Example 4 |
|---|---|
| Final pH | 7.31 |
| Specific Surface Area (m$^2$/g) | 107.9 |
| Primary Particle Diameter (nm) | 25.3 |

TABLE 10-continued

Figure 19:
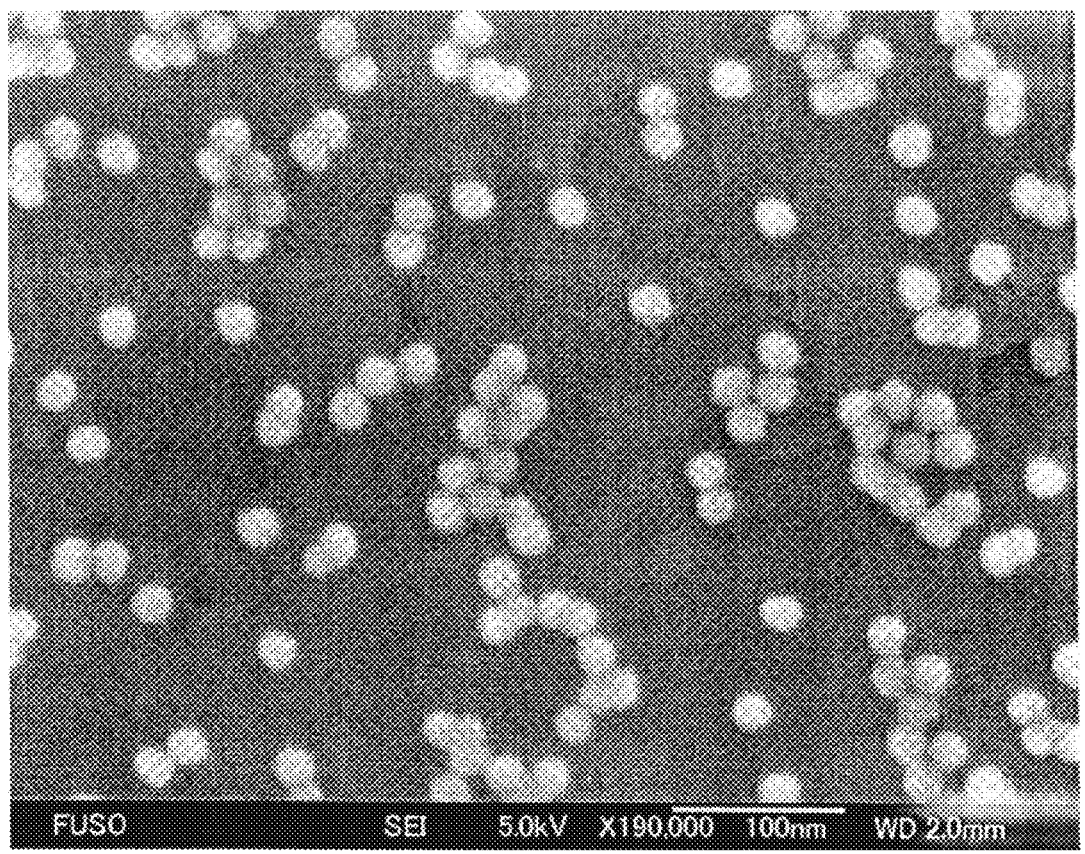
FIG. 19 is a scanning electron microscope (SEM) observation image of the colloidal silica obtained in Comparative Example 5.

| Item | Comparative Example 4 |
| --- | --- |
| Secondary Particle Diameter (nm) | 33.7 |
| Standard Deviation | 9.3 |
| Aggregate Ratio | 1.33 |
| Specific Gravity | 1.124 |
| Electric Conductivity (μS/cm) | 98.2 |
| Kinematic Viscosity (mm$^2$/s) | 5.7 |
| Silica Content (%) | 20.1 |
| Comparative Example 4: SEM Image | See FIG. 19 |
| Ratio of Bent/Branched Particle Structure | 1.1% (1 out of 92) Mainly spherical particles are only observed together with cocoon-shaped particles. |
| CV Value | 59.8 |
| Average Aspect Ratio | 1.2/92 |

When TMOS was directly fed in place of the hydrolysis liquid, the pH was lowered, similar to the case where the hydrolysis liquid was used; however, deformation of the particles did not occur. This reveals that it is indispensable that TMOS be preliminarily hydrolyzed to prepare a hydrolysis liquid.

In this Comparative Example, the reaction temperature was adjusted to 80° C. This is because TMOS volatilizes when boiled at 100° C., causing adherence of silica to a gas layer, which results in significant deterioration of the filterability. By preliminarily preparing a nonvolatile hydrolysis liquid, problems such as those mentioned above caused by volatilization can be avoided, and denser particles can be formed at a higher temperature.

The invention claimed is:

1. A colloidal silica obtained by using an alkyl silicate as starting material, the colloidal silica containing silica secondary particles having a bent structure and/or a branched structure, wherein the silica secondary particles have an average aspect ratio of less than 5 within a 200,000× magnified arbitrary view observed through a scanning electron microscope.

2. The colloidal silica according to claim 1, wherein the alkyl silicate is tetramethyl orthosilicate.

3. A polishing material comprising the colloidal silica of claim 1.

4. A polishing material comprising the colloidal silica of claim 2.

5. A production method for producing the colloidal silica according to claim 1, comprising the steps of:
1) preparing a mother liquid containing an alkali catalyst and water, and having a pH of 9 to 12; and
2) adding a hydrolysis liquid obtained by hydrolysis of an alkyl silicate to the mother liquid, wherein the step of adding the hydrolysis liquid to the mother liquid sequentially comprises:
A) step 1 of adding the hydrolysis liquid until the pH of the resulting liquid mixture becomes less than 7;
B) step 2 of adding an aqueous alkali solution until the pH of the liquid mixture becomes 7 or more; and
C) step 3 of adding the hydrolysis liquid while maintaining the pH of the liquid mixture at 7 or more.

6. The production method according to claim 5, wherein the alkyl silicate is tetramethyl orthosilicate.

7. The production method according to claim 6, wherein the hydrolysis is carried out in the absence of a catalyst.

8. The production method according to claim 6, wherein in step 1, the hydrolysis liquid is added until the pH of the liquid mixture becomes 6 or more and less than 7.

9. The production method according to claim 6, wherein in steps 1 and 3, the hydrolysis liquid is added to the mother liquid at a rate of 41 g silica/hour/kg of mother liquid, or less.

10. The production method according to claim 6, wherein steps 1 to 3 are carried out without adding seed particles to the mother liquid in advance.

11. The production method according to claim 5, wherein the hydrolysis is carried out in the absence of a catalyst.

12. The production method according to claim 11, wherein in step 1, the hydrolysis liquid is added until the pH of the liquid mixture becomes 6 or more and less than 7.

13. The production method according to claim 11, wherein in steps 1 and 3, the hydrolysis liquid is added to the mother liquid at a rate of 41 g silica/hour/kg of mother liquid, or less.

14. The production method according to claim 11, wherein steps 1 to 3 are carried out without adding seed particles to the mother liquid in advance.

15. The production method according to claim 5, wherein in step 1, the hydrolysis liquid is added until the pH of the liquid mixture becomes 6 or more and less than 7.

16. The production method according to claim 15, wherein in steps 1 and 3, the hydrolysis liquid is added to the mother liquid at a rate of 41 g silica/hour/kg of mother liquid, or less.

17. The production method according to claim 15, wherein steps 1 to 3 are carried out without adding seed particles to the mother liquid in advance.

18. The production method according to claim 5, wherein in steps 1 and 3, the hydrolysis liquid is added to the mother liquid at a rate of 41 g silica/hour/kg of mother liquid, or less.

19. The production method according to claim 18, wherein steps 1 and 2 are carried out so that the liquid mixture has a pH value of less than 7 for 0.5 to 5 hours.

20. The production method according to claim 5, wherein steps 1 to 3 are carried out without adding seed particles to the mother liquid in advance.

* * * * *